(12) United States Patent
Taniguchi

(10) Patent No.: US 11,192,472 B2
(45) Date of Patent: Dec. 7, 2021

(54) SLIDING DEVICE

(71) Applicants: TOYOTA BOSHOKU KABUSHIKI KAISHA, Aichi (JP); TACHI-S CO., LTD., Tokyo (JP); TF-METAL CO., LTD., Shizuoka (JP)

(72) Inventor: Kosuke Taniguchi, Aichi (JP)

(73) Assignees: TOYOTA BOSHOKU KABUSHIKI KAISHA, Aichi (JP); TACHI-S CO., LTD., Tokyo (JP); TF-METAL CO., LTD., Shizuoka (JP)

( * ) Notice: Subject to any disclaimer, the term of this patent is extended or adjusted under 35 U.S.C. 154(b) by 78 days.

(21) Appl. No.: 16/749,137

(22) Filed: Jan. 22, 2020

(65) Prior Publication Data

US 2020/0238859 A1 Jul. 30, 2020

(30) Foreign Application Priority Data

Jan. 25, 2019 (JP) .............................. JP2019-011145

(51) Int. Cl.
*B60N 2/08* (2006.01)
*B60N 2/07* (2006.01)

(52) U.S. Cl.
CPC ......... *B60N 2/0875* (2013.01); *B60N 2/0727* (2013.01); *B60N 2/0818* (2013.01)

(58) Field of Classification Search
CPC .. B60N 2/0727; B60N 2/0812; B60N 2/0818; B60N 2/0831; B60N 2/0862; B60N 2/0868; B60N 2/0875; B60N 2/0881; B60N 2/0887
USPC ............ 248/424, 429, 430; 296/65.13–65.15
See application file for complete search history.

(56) References Cited

U.S. PATENT DOCUMENTS

| 6,772,985 B2 | 8/2004 | Lee | |
| 7,604,214 B2* | 10/2009 | Kojima | B60N 2/0705 248/430 |
| 7,665,791 B2* | 2/2010 | Kojima | B60N 2/0705 296/65.13 |

(Continued)

FOREIGN PATENT DOCUMENTS

| GB | 1423963 A | * 2/1976 | .......... B60N 2/0875 |
| JP | 2015093578 A | * 5/2015 | ............. B60N 2/085 |
| JP | 6090107 | 3/2017 | |

OTHER PUBLICATIONS

U.S. Office Action issued in U.S. Appl. No. 16/749,184, dated Feb. 3, 2021.

(Continued)

*Primary Examiner* — Jonathan Liu
*Assistant Examiner* — Guang H Guan
(74) *Attorney, Agent, or Firm* — Greenblum & Bernstein, P.L.C.

(57) ABSTRACT

A sliding device includes a fixed rail, a movable rail, a lock plate, a spring member, and a first stopper and a second stopper provided on the lock plate. The lock plate is held by the movable rail, and is displaceable between a locking position where the lock plate engages with the fixed rail and a non-locking position where the engagement is released. The spring member can exert an elastic force to maintain the lock plate in the locking position. The first stopper locks and fixes a first end of the lock plate to the spring member. The second stopper locks and fixes a second end of the lock plate to the spring member.

7 Claims, 18 Drawing Sheets

(56) References Cited

U.S. PATENT DOCUMENTS

| | | | | |
|---|---|---|---|---|
| 7,717,490 B2* | 5/2010 | Kojima | ................ | B60N 2/0825 |
| | | | | 296/65.13 |
| 8,146,878 B2* | 4/2012 | Kojima | ................ | B60N 2/0843 |
| | | | | 248/429 |
| 8,398,043 B2* | 3/2013 | Kimura | ................ | B60N 2/0705 |
| | | | | 248/424 |
| 8,708,300 B2* | 4/2014 | Fujishiro | ............. | B60N 2/4214 |
| | | | | 248/429 |
| 9,038,981 B2* | 5/2015 | Hoshihara | ............ | B60N 2/0727 |
| | | | | 248/429 |
| 9,150,124 B2 | 10/2015 | Becker et al. | | |
| 9,283,870 B2 | 3/2016 | Yamada et al. | | |
| 9,315,119 B2* | 4/2016 | Yamada | ................ | B60N 2/0818 |
| 9,327,615 B2 | 5/2016 | Yamada et al. | | |
| 9,914,373 B2 | 3/2018 | Sato | | |
| 10,160,351 B2* | 12/2018 | Sugimoto | ............ | B60N 2/0705 |
| 10,272,802 B2* | 4/2019 | Matsufuji | ............ | B60N 2/0843 |
| 10,434,902 B2 | 10/2019 | Hayashi | | |
| 10,654,379 B2* | 5/2020 | Hayashi | ................ | B60N 2/0806 |
| 10,940,775 B2* | 3/2021 | Tamaki | ................ | B60N 2/0818 |
| 11,110,825 B2* | 9/2021 | Taniguchi | ............ | B60N 2/0705 |
| 2011/0108697 A1 | 5/2011 | Ito et al. | | |
| 2011/0233366 A1 | 9/2011 | Mizuno et al. | | |
| 2017/0334319 A1 | 11/2017 | Sprenger | | |
| 2018/0079325 A1 | 3/2018 | Hayashi | | |
| 2020/0189424 A1 | 6/2020 | Kuroda et al. | | |
| 2020/0238859 A1* | 7/2020 | Taniguchi | ............ | B60N 2/0818 |
| 2020/0238860 A1* | 7/2020 | Taniguchi | ............ | B60N 2/0727 |
| 2020/0238861 A1* | 7/2020 | Taniguchi | ............ | B60N 2/0818 |

OTHER PUBLICATIONS

U.S. Office Action issued in U.S. Appl. No. 16/749,374, dated Jun. 9, 2021.

* cited by examiner

SLIDING DEVICE

CROSS-REFERENCE TO RELATED APPLICATIONS

This application claims the benefit of Japanese Patent Application No. 2019-11145 filed on Jan. 25, 2019 with the Japan Patent Office, the entire disclosure of which is incorporated herein by reference.

BACKGROUND

The present disclosure relates to a sliding device that slidably supports a seat.

For example, a sliding device disclosed in Japanese Patent No. 6090107 (Patent Document 1) comprises a fixed rail, a movable rail, a lock lever, a spring, and so on. The lock lever is provided with locking claws.

The lock lever is pivotally displaced between a locking position and a non-locking position with its longitudinally intermediate part rotatably supported by the movable rail. The locking position is a position where the locking claws engage with the movable rail and the fixed rail. The non-locking position is a position where the engagement of the locking claws with the rails is released.

The spring is formed into a lever shape, and applies to the lock lever an elastic force to maintain the lock lever in the locking position. Specifically, the spring presses the lock lever at a longitudinal end thereof in a state where a longitudinally intermediate part of the spring is supported by the movable rail.

SUMMARY

The present disclosure discloses an example of a sliding device with simple configuration.

A sliding device in one aspect of the present disclosure slidably supports a seat. The sliding device comprises a fixed rail, a movable rail, a lock plate, a spring member, a first stopper, and a second stopper. A seat body of the seat is fixed to the movable rail. The movable rail is slidable relative to the fixed rail. The lock plate is held by the movable rail, and is displaceable in a direction substantially orthogonal to a sliding direction. The lock plate is displaced between a locking position where the lock plate engages with the fixed rail and restricts slide of the movable rail and a non-locking position where the restriction of slide is released. The lock plate has a plate surface that crosses a displacement direction of the lock plate. The spring member applies to the plate surface an elastic force to maintain the lock plate in the locking position. The first stopper is provided on the lock plate. The first stopper locks and fixes a first end in the sliding direction of the lock plate to the spring member. The second stopper is provided on the lock plate. The second stopper locks and fixes a second end in the sliding direction of the lock plate to the spring member. The second stopper is provided at a position shifted in a direction orthogonal to the displacement direction and the sliding direction relative to the first stopper.

Thus, the lock plate of the sliding device is displaced between the locking position and the non-locking position in the direction substantially orthogonal to the sliding direction. The spring member of the sliding device applies the elastic force to the lock plate.

Since the lock plate is locked and fixed to the spring member by the first stopper and the second stopper, the lock plate is stably fixed to the spring member. Therefore, operation of the lock plate is stable.

The sliding device, for example, may be configured as follows.

The spring member may be formed by bending a metallic wire rod into a preset specific shape. The spring member may be provided with an acting portion that applies the elastic force to the plate surface. The acting portion may extend from the first stopper side to the second stopper side. Further, the acting portion may be configured to apply the elastic force to the plate surface at least at a portion in a range from a first end to a second end of the acting portion. Therefore, in the sliding device, the elastic force can be stably applied to the lock plate.

The spring member may comprise a first locked portion and a second locked portion. The first locked portion is locked to the first stopper, and extends in a direction substantially orthogonal to the acting portion. The second locked portion is locked to the second stopper, and extends in the direction substantially orthogonal to the acting portion. Therefore, in the sliding device, since the lock plate is interposed between the first locked portion and the second locked portion, displacement of the lock plate in the sliding direction can be restricted.

The sliding device may further comprise an operation member that receives an operation force and is displaced from its initial position. The operation member may comprise a pressing portion that applies the operation force to the lock plate. The operation member displaces the lock plate to the non-locking position. The pressing portion projected on a virtual plane parallel to the plate surface may extend in a direction crossing the acting portion projected on the virtual plane so as to cut across the projected acting portion.

Therefore, in the sliding device, large deviation can be inhibited between a point of action of the operation force applied to the lock plate and a point of action of the elastic force. Therefore, the lock plate stably operates in the sliding device.

The spring member may comprise a first spring portion and a second spring portion, in addition to the acting portion. The first spring portion extends in a first orientation in the sliding direction from the acting portion. The second spring portion extends in a second orientation in the sliding direction from the acting portion. The acting portion, the first spring portion, and the second spring portion may be formed by one metallic wire rod. Further, the first spring portion may be shifted in a seat-width axis relative to the second spring portion. Thus, manufacturing of the spring member is easy.

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENTS

Embodiments described below show some example embodiments within the technical scope of the present disclosure. Matters and the like used to define the invention recited in the claims are not be limited to a specific configuration, structure, etc. defined in the embodiments below.

The present embodiments show an example in which a sliding device of the present invention is applied to a seat mounted on a vehicle or the like (hereinafter, "vehicle seat"). Arrows and the like indicating directions are attached to each figure to make it easy to understand the relationship between the figures, the shape of members or portions, and the like.

Thus, the sliding device of the present disclosure is not limited by the directions attached to each figure. The directions shown in each figure correspond to directions in a state where the vehicle seat according to the present embodiment is assembled to a vehicle.

At least one member or portion is provided for a member or portion in the embodiments, unless explicitly specified as "only one member" or the like. In other words, unless explicitly specified as "only one member" or the like, two or more members may be provided.

First Embodiment

1. Outline of Vehicle Seat

Figure 1:
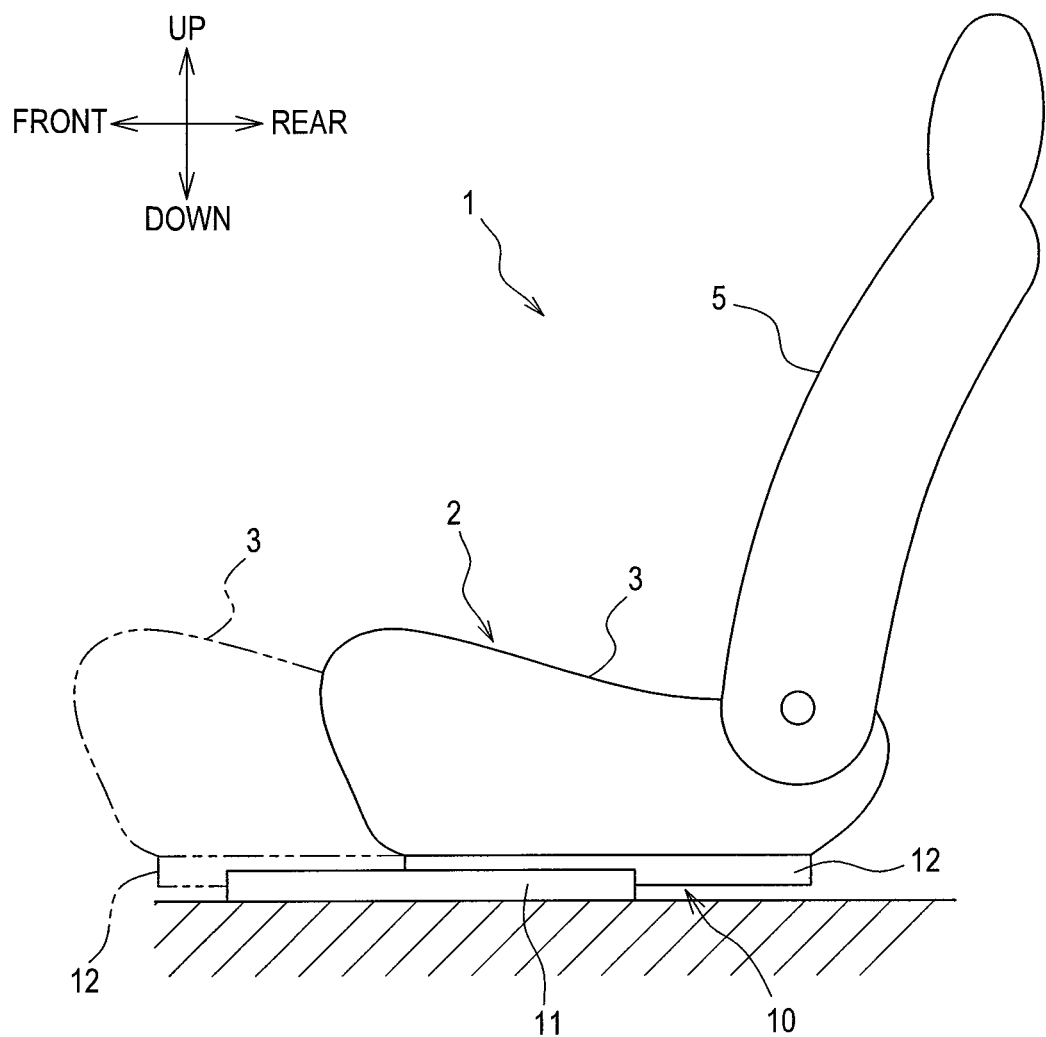
FIG. 1 shows a vehicle seat according a first embodiment.

As shown in FIG. 1, a vehicle seat 1 according to the present embodiment comprises at least two sliding devices 10 and a seat body 2. The seat body 2 at least comprises a seat cushion 3 and a seatback 5.

The seat cushion 3 supports the buttocks of an occupant. The seatback 5 supports the back of the occupant. The sliding device 10 slidably supports the seat body 2 of the vehicle seat 1.

The seat body 2 is slidably supported by the two sliding devices 10. Specifically, the first sliding device 10 supports a first end in a seat-width axis of the seat body 2. The second sliding device 10 supports a second end in the seat-width axis of the seat body 2.

2. Configuration of Sliding Device 2.1 Outline of Sliding Device

The two sliding devices 10 in the present embodiment have an identical structure. The following describes the left sliding device 10 arranged at a left end in the seat-width axis. The left sliding device 10, as shown in FIG. 2, at least comprises a fixed rail 11, a movable rail 12, a lock plate 13, a spring member 14 and an operation member 16.

<Fixed Rail, Movable Rail, and the Like>

The fixed rail 11 is directly or indirectly fixed to the vehicle. The seat body 2 is fixed to the movable rail 12. The movable rail 12 is slidable relative to the fixed rail 11.

Figure 2:
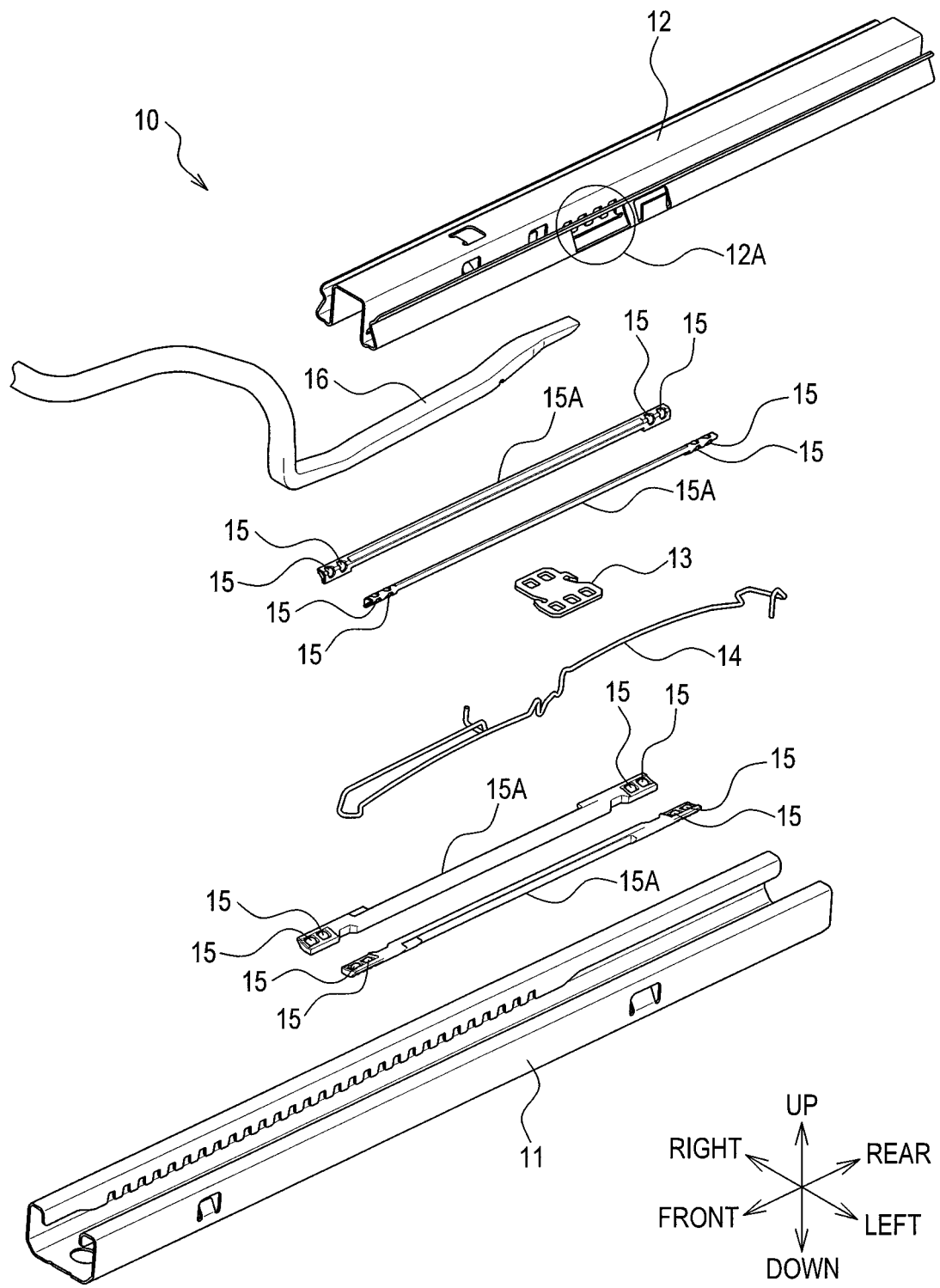
FIG. 2 is an exploded view of a sliding device according to the first embodiment.

As shown in FIG. 2, the movable rail 12 of the present embodiment is supported by the fixed rail 11 via steel balls (in the present embodiment, sixteen steel balls) 15. The steel balls 15 are one example of spherical rolling elements that come into rolling contact with the movable rail 12 and the fixed rail 11.

Retainers 15A restrict movement of each steel ball 15 relative to the movable rail 12. This allows the steel balls 15 to come into rolling contact with the movable rail 12 and the fixed rail 11 without moving relative to the movable rail 12. Therefore, the movable rail 12 can slide relative to the fixed rail 11.

Figure 3:
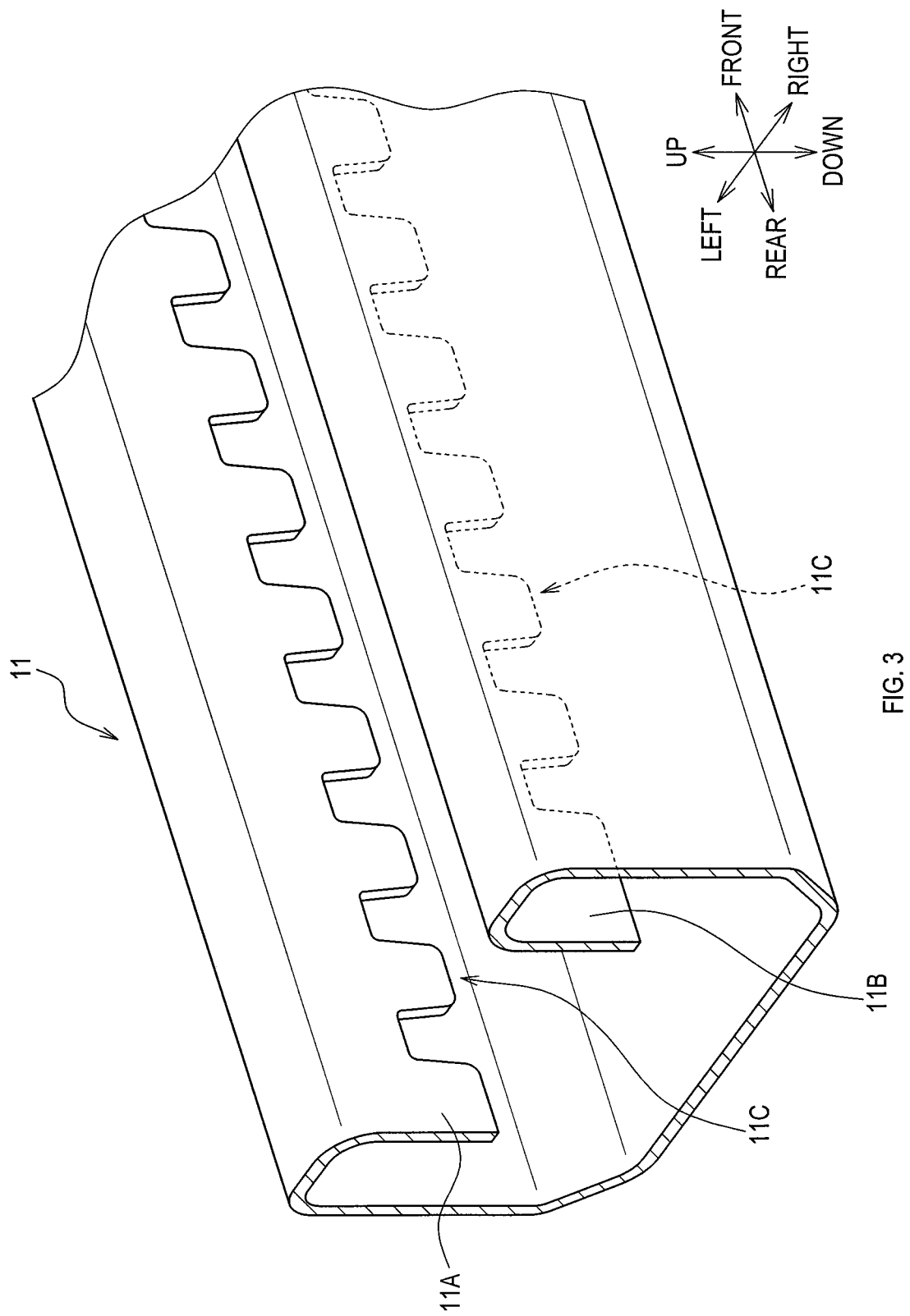
FIG. 3 shows a fixed rail according to the first embodiment.

As shown in FIG. 3, a comb portion 11C is provided at each of portions 11A, 11B of the fixed rail 11 that face respective lateral surfaces of the movable rail 12. Each comb portion 11C has protrusions and recesses alternately provided in series along a longitudinal direction of the fixed rail 11.

The lateral surfaces of the movable rail 12 are surfaces substantially parallel to a sliding direction of the movable rail 12. The movable rail 12 slides relative to the fixed rail 11 in a space between the portion 11A and the portion 11B of the fixed rail 11.

Figure 4:
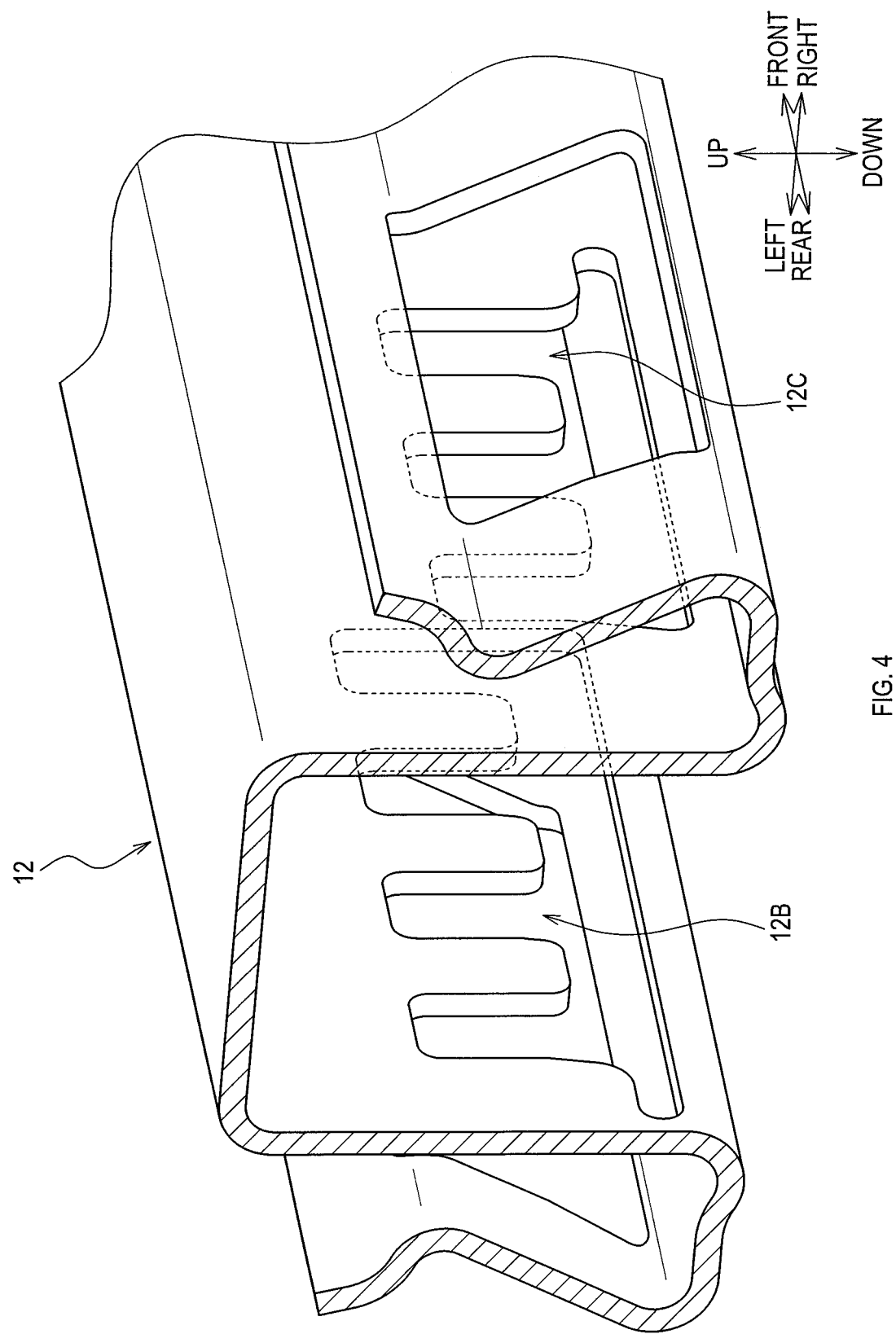
FIG. 4 shows a movable rail according to the first embodiment.

As shown in FIG. 4, comb portions 12B, 12C that respectively face the portions 11A and 11B are provided in a longitudinally intermediate part 12A (see FIG. 2) of the movable rail 12.

Each of the comb portions 12B, 12C has protrusions and recesses alternately provided in series along a longitudinal direction of the movable rail 12. The protrusions and recesses of the comb portions 11C and the protrusions and recesses of the comb portions 12B, 12C are generally congruent.

The protrusions of the comb portions 11C and the comb portions 12B, 12C protrude downward. In other words, the recesses of the comb portions 11C and the comb portions 12B, 12C have open bottoms.

A region with the comb portions 11C is greater than regions with the comb portions 12B, 12C. In the present embodiment, the number of protrusions and recesses of the comb portion 12B is greater than the number of the protrusions and recesses of the comb portion 12C.

<Lock Plate>

Figure 5:
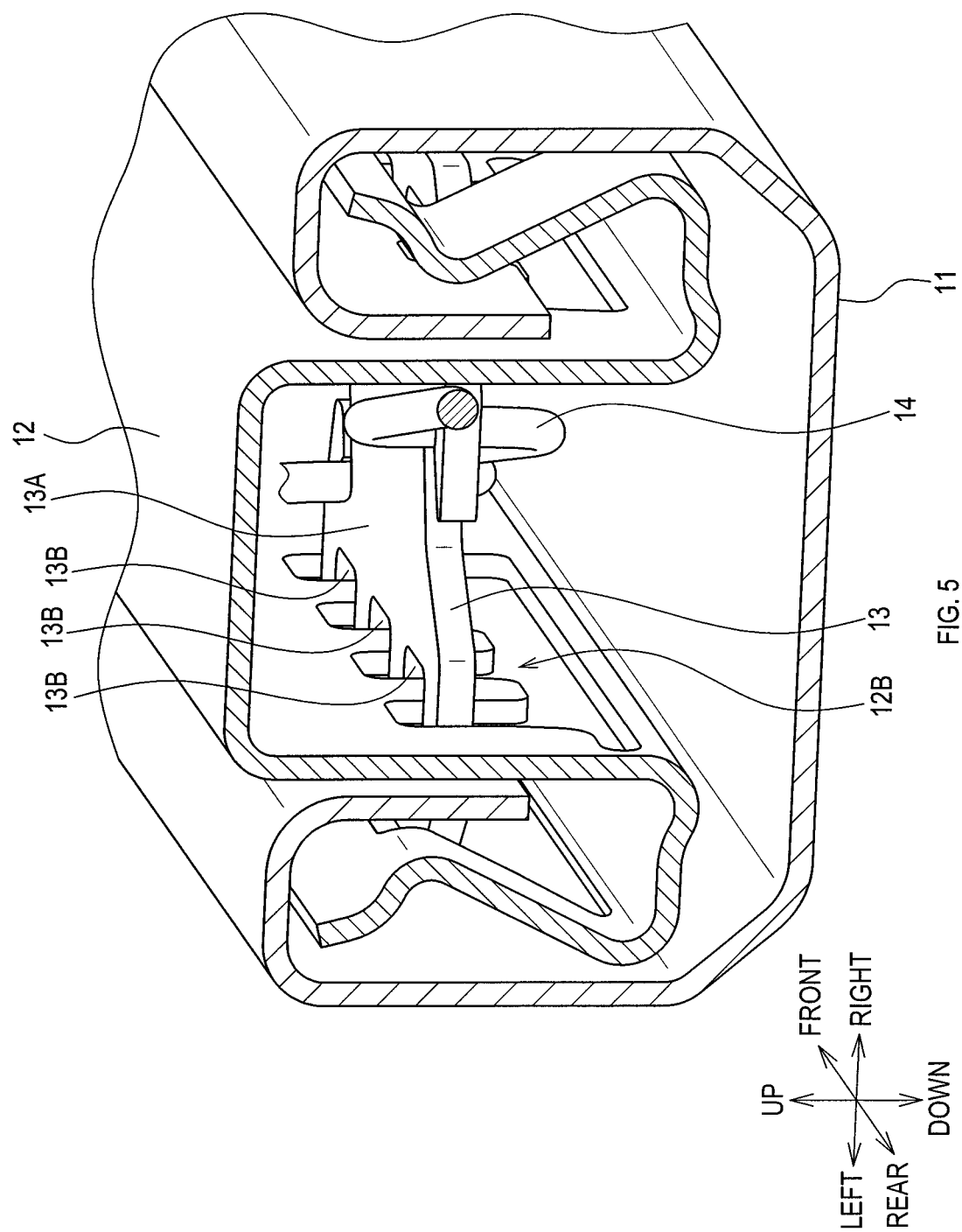
FIG. 5 shows an operation of a lock plate according to the first embodiment.

As shown in FIG. 5, the lock plate 13 is held by the movable rail 12, and is slidable relative to the fixed rail 11, together with the movable rail 12. The lock plate 13 is displaceable relative to the movable rail 12 in a direction substantially orthogonal to the sliding direction (in the present embodiment, up-down direction).

Figure 6:
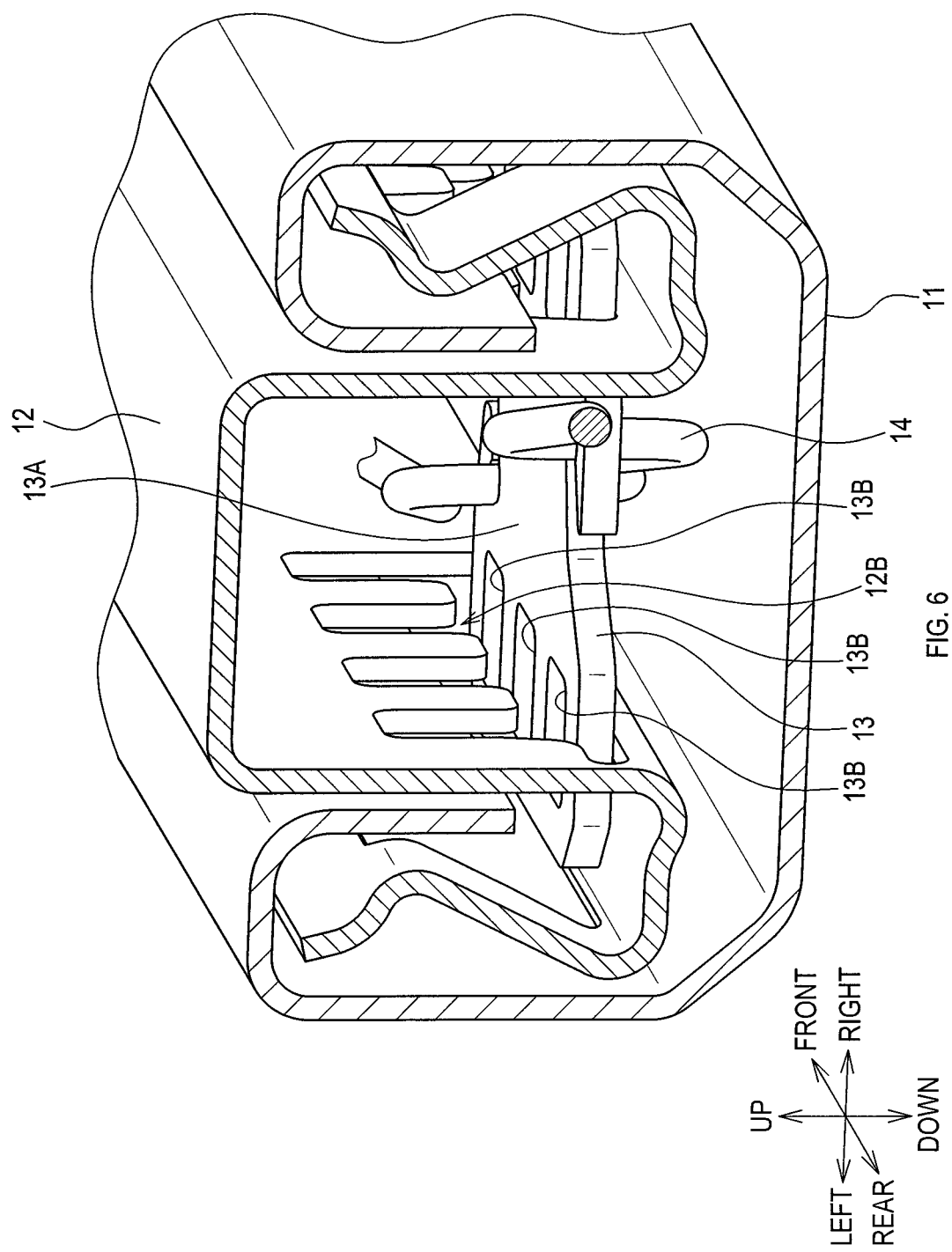
FIG. 6 shows an operation of the lock plate according to the first embodiment.

In other words, the lock plate 13 is displaceable between a locking position (see FIG. 5) and a non-locking position (see FIG. 6). The lock plate 13 has plate surfaces 13A that cross the displacement direction (in the present embodiment, up-down direction).

The locking position is a position where the lock plate 13 engages with the fixed rail 11 and restricts slide of the movable rail 12. The non-locking position is a position of the lock plate 13 where the restriction is released and the movable rail 12 becomes slidable.

Specifically, the lock plate 13 is provided with through holes 13B through which the protrusions of the comb portions 11C and the comb portions 12B, 12C can pass. When the lock plate 13 is in the locking position (see FIG. 5), some of the protrusions of the comb portions 11C and the protrusions of the comb portions 12B, 12C pass through the through holes 13B.

When the lock plate 13 is displaced downward from the locking position to the non-locking position (see FIG. 6), the lock plate 13 is spaced apart from the comb portions 11C and the comb portions 12B, 12C. Therefore, the movable rail 12 becomes slidable relative to the fixed rail 11.

<Spring Member and Operation Member>

Figure 7:
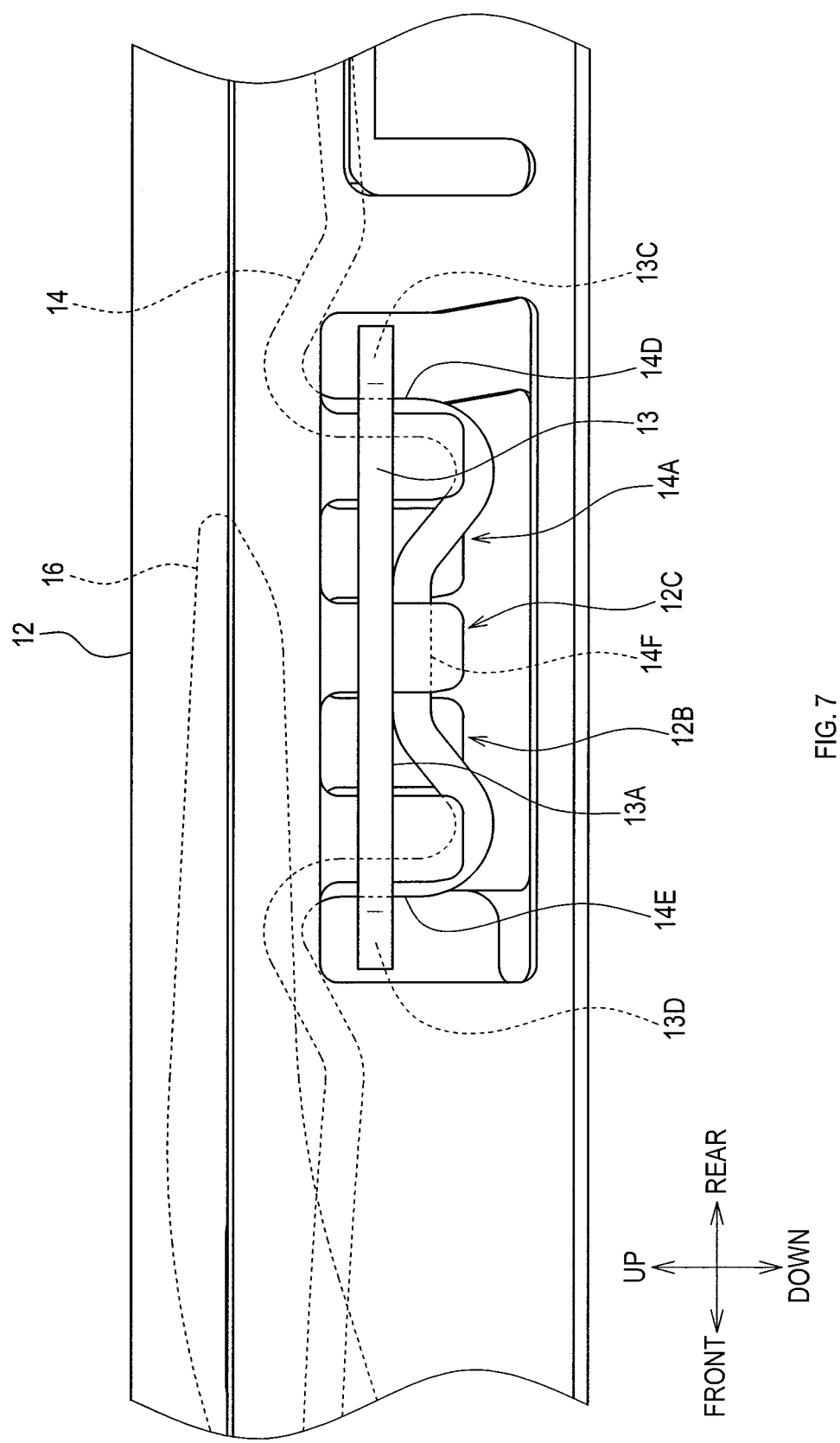
FIG. 7 shows a spring member, the lock plate and the like according to the first embodiment.

As shown in FIG. 7, the spring member 14 exerts an elastic force that maintains the lock plate 13 in the locking position. The spring member 14 applies the elastic force to the plate surface 13A of the lock plate 13.

The spring member 14 of the present embodiment applies the elastic force to one, that faces the non-locking position, of the two plate surfaces 13A (upper and lower) of the lock plate 13. In other words, the spring member 14 applies an upward elastic force to the lower plate surface 13A of the lock plate 13 in the present embodiment.

The operation member 16 receives an operation force and is displaced from its initial position (position shown by a broken line in FIG. 7). The operation member 16 applies the operation force to the lock plate 13 and displaces the lock plate 13 to the non-locking position.

As shown in the broken line in FIG. 7, the initial position indicates a position where the operation member 16 is spaced apart from the lock plate 13 in the locking position, or a position where the lock plate 13 in the locking position and the operation member 16 are in contact with each other.

2.2 Coupling Structure of Spring Member and Lock Plate

Figure 8:
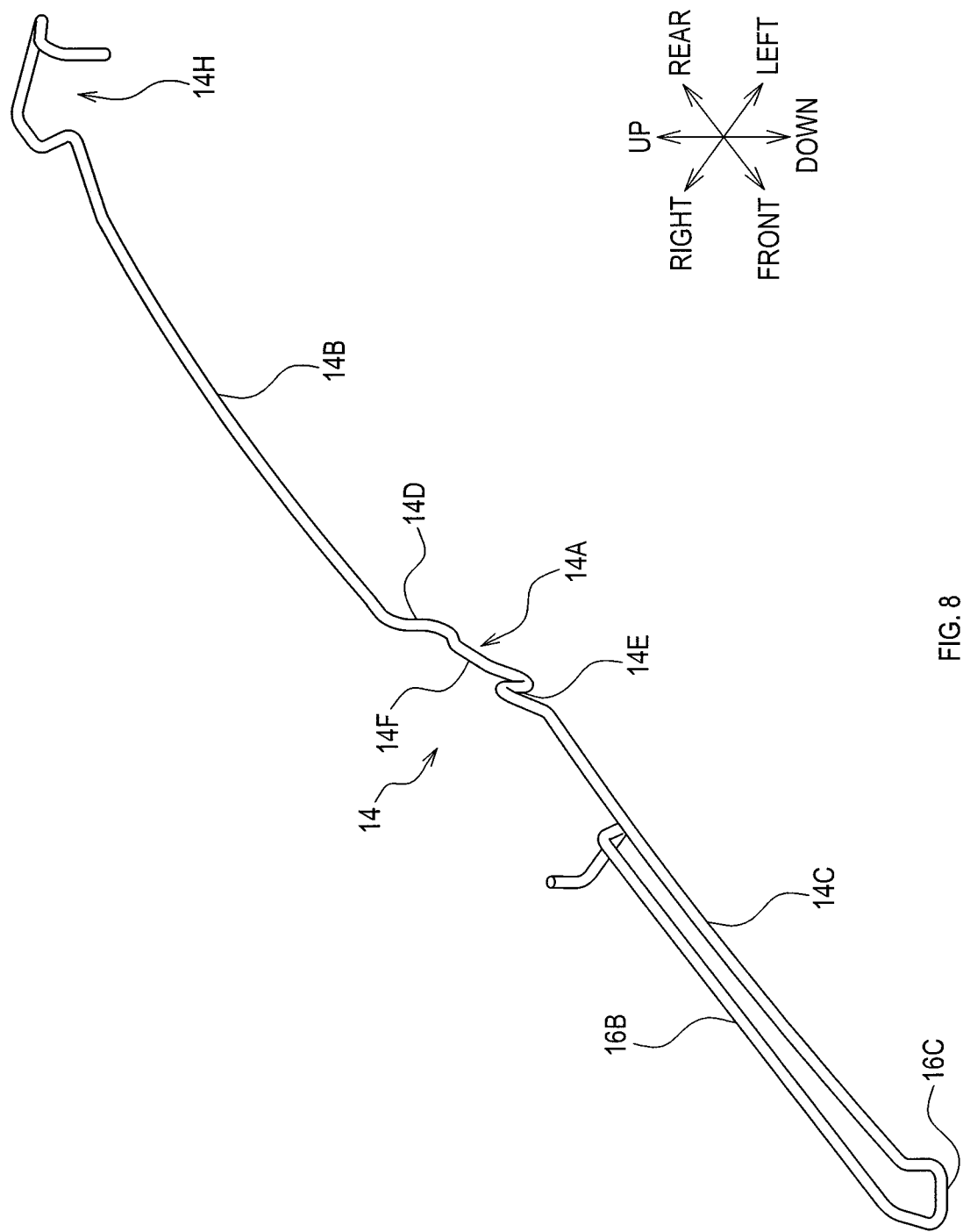
FIG. 8 shows a spring member according to the first embodiment.

As shown in FIG. 8, the spring member 14 at least comprises a coupling portion 14A, a first spring portion 14B, and a second spring portion 14C. As shown in FIG. 7, the coupling portion 14A is a portion where the lock plate 13 is coupled.

<Configuration of Coupling Portion and Lock Plate>

The coupling portion 14A comprises a first restricting portion 14D, a second restricting portion 14E, an acting portion 14F, and the like. The first restricting portion 14D restricts displacement of the lock plate 13 in a first orientation in the sliding direction relative to the spring member 14.

The second restricting portion 14E restricts displacement of the lock plate 13 in a second orientation in the sliding direction relative to the spring member 14. The first orientation in the sliding direction corresponds to a seat rearward direction in the present embodiment. The second orientation in the sliding direction corresponds to a seat frontward direction in the present embodiment.

Figure 9:
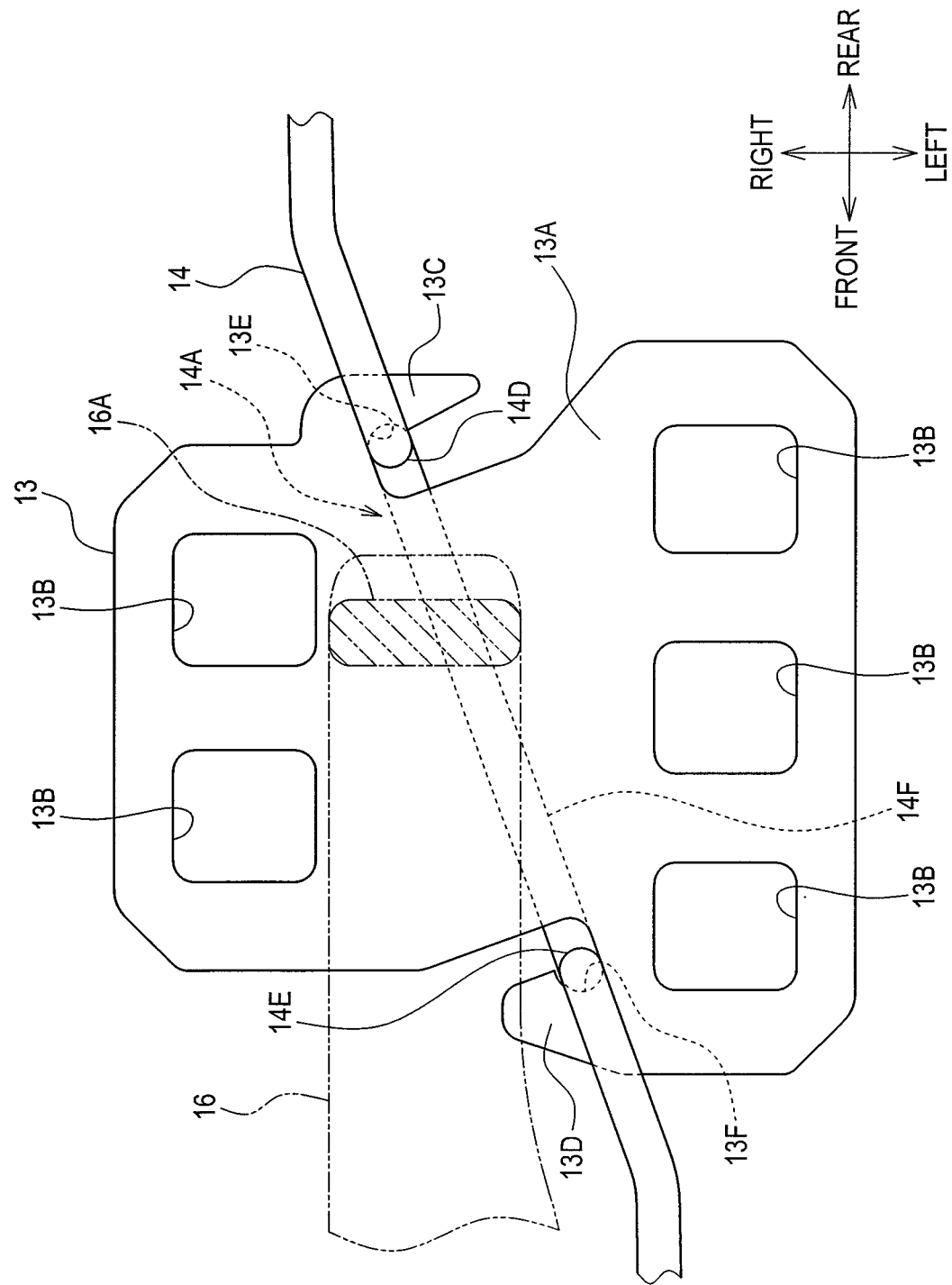
FIG. 9 shows the spring member and the lock plate according to the first embodiment.

As shown in FIG. 9, the first restricting portion 14D and the second restricting portion 14E are locked and fixed in a state in contact with a first stopper 13C and a second stopper 13D, respectively. The first stopper 13C and the second stopper 13D are provided on the lock plate 13.

The first stopper 13C locks and fixes a first end in the sliding direction of the lock plate 13 to the spring member 14. The second stopper 13D locks and fixes a second end in the sliding direction of the lock plate 13 to the spring member 14.

In other words, the first restricting portion 14D functions as a first locked portion locked to the first stopper 13C. The second restricting portion 14E functions as a second locked portion locked to the second stopper 13D. Further, the first stopper 13C and the second stopper 13D function as a third restricting portion and a fourth restricting portion respectively.

The third restricting portion and the fourth restricting portion restrict displacement of the lock plate 13 in the displacement direction of the lock plate 13 and a direction orthogonal to the sliding direction (in the present embodiment, seat-width axis) relative to the spring member 14.

In other words, in the present embodiment, the first stopper 13C is configured as a first hook, and the second stopper 13D is configured as a second hook. The first hook has a first recess 13E. The first recess 13E contacts and surrounds the spring member 14 (first restricting portion 14D) from three sides, and is open on one side.

The second hook, that is, the second stopper 13D, has a second recess 13F. The second recess 13F contacts and surrounds the spring member 14 (second restricting portion 14E) from three sides, and is open on one side.

Figure 10:
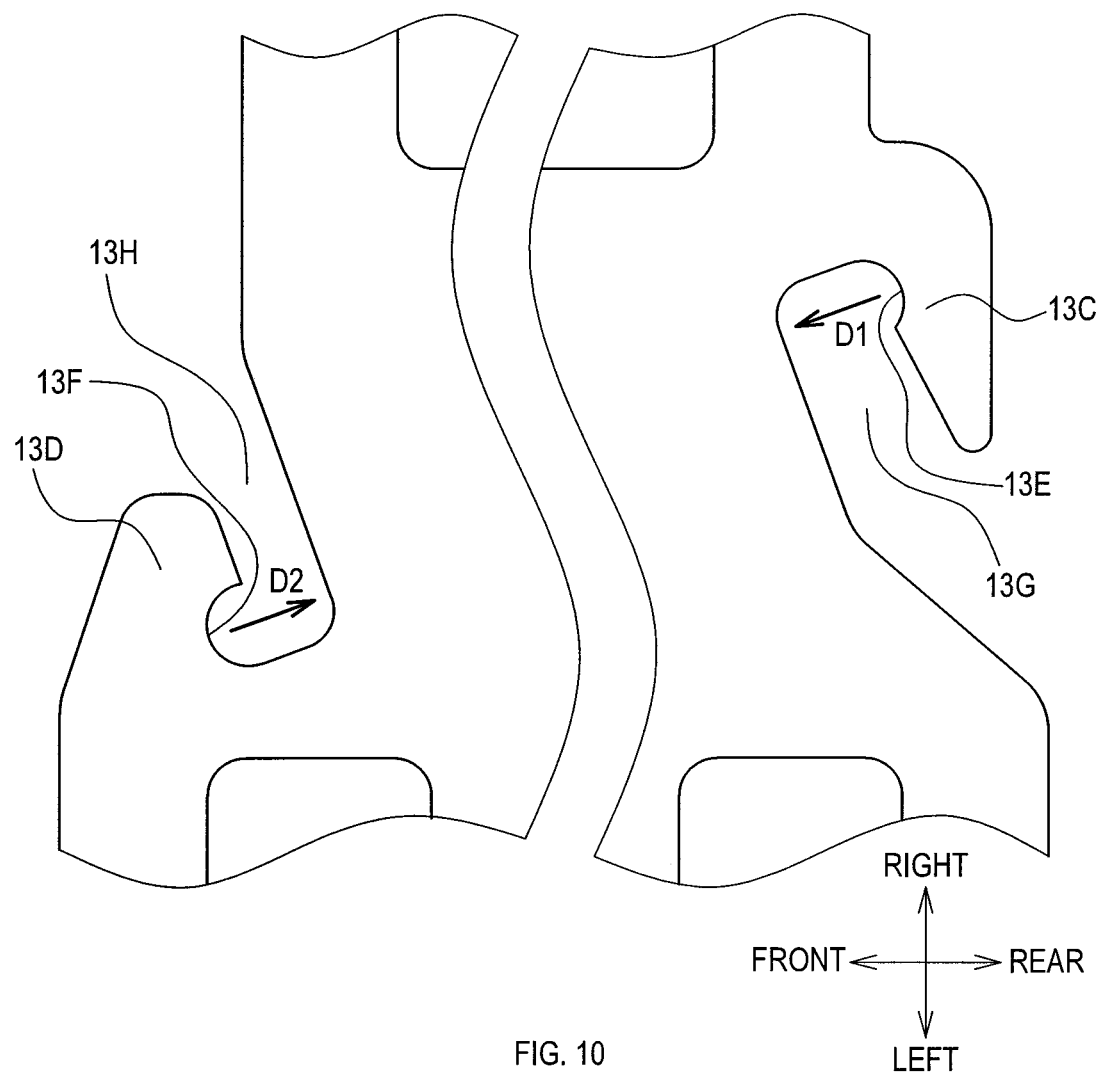
FIG. 10 shows the lock plate according to the first embodiment.

As shown in FIG. 10, the first hook, that is, the first stopper 13C, is provided with a first guide groove 13G. The first guide groove 13G communicates with an opening of the first recess 13E and extends in a direction crossing an opening direction D1 of the opening.

The second stopper 13D is provided with a second guide groove 13H. The second guide groove 13H communicates with an opening of the second recess 13F and extends in a direction crossing an opening direction D2 of the opening.

In other words, the first hook, that is, the first stopper 13C, is provided with a substantially L-shaped groove-like opening by the first recess 13E and the first guide groove 13G. The second hook, that is, the second stopper 13D, is provided with a substantially L-shaped groove-like opening by the second recess 13F and the second guide groove 13H.

The second stopper 13D is provided at a position shifted in the displacement direction of the lock plate 13 and a direction orthogonal to the sliding direction (in the present embodiment, seat-width axis) relative to the first stopper 13C. Further, in the present embodiment, the first stopper 13C and the second stopper 13D are substantially rotationally symmetric with each other.

In other words, in FIG. 9, when the first stopper 13C and the second stopper 13D rotate 180 degrees clockwise around a midpoint of a virtual line that couples a center of the first recess 13E and a center of the second recess 13F, the first stopper 13C before the rotation and the second stopper 13D after the rotation overlap with each other, and the second stopper 13D before the rotation and the first stopper 13C after the rotation overlap with each other.

<Acting Portion>

Returning to FIG. 7, the acting portion 14F is a region of the spring member 14 that applies the elastic force of the spring member 14 to the plate surface 13A. The acting portion 14F is a straight portion that extends from the first stopper 13C side to the second stopper 13D side.

The acting portion 14F is configured to apply the elastic force to the plate surface 13A with the entire region from a first end (right end in FIG. 7) to a second end (left end in FIG. 7) of the acting portion 14F. Therefore, as shown in FIG. 9, the region where the acting portion 14F of the present embodiment applies the elastic force to the lock plate 13 is a strip-shaped region tilted with respect to the sliding direction on the plate surface 13A.

As shown in FIGS. 7 to 9, the coupling portion 14A, that is, the first restricting portion 14D, the second restricting portion 14E and the acting portion 14F, are formed by bending one metallic wire rod into a preset specific shape. The first restricting portion 14D and the second restricting portion 14E are each formed by a bent portion obtained by bending the metallic wire rod that forms the spring member 14.

The first restricting portion 14D, that is, the first locked portion, is a region of the coupling portion 14A that extends in a direction substantially orthogonal to the acting portion 14F. The second restricting portion 14E, that is, the second locked portion, is a region of the coupling portion 14A that extends in a direction substantially orthogonal to the acting portion 14F.

<First Spring Portion and Second Spring Portion>

As shown in FIG. 8, the first spring portion 14B is a region extending from the coupling portion 14A (in the present embodiment, first restricting portion 14D) in the first orientation and having a leading end part in its extending direction fixed to the movable rail 12. The second spring portion 14C is a region extending from the coupling portion 14A (in the present embodiment, second restricting portion 14E) in the second orientation and having a leading end part in its extending direction fixed to the movable rail 12.

The first spring portion 14B, the second spring portion 14C, and the coupling portion 14A are formed by bending one metallic wire rod into a preset specific shape. The elastic force applied to the lock plate 13 is mainly a force generated by elastic deformation of the first spring portion 14B and the second spring portion 14C.

The first spring portion 14B is shifted in the seat-width axis relative to the second spring portion 14C. In the present embodiment, as shown in FIG. 8, the first spring portion 14B is shifted to the right in the seat-width axis relative to the second spring portion 14C.

<Fixing Structure of First Spring Portion>

As shown in FIGS. 8 and 11 to 14, a fixing structure of the leading end part in the extending direction of the first spring portion 14B and the movable rail 12 has a tapered portion 14G, a press spring portion 14H, and the like, provided in the first spring portion 14B.

Figure 12:
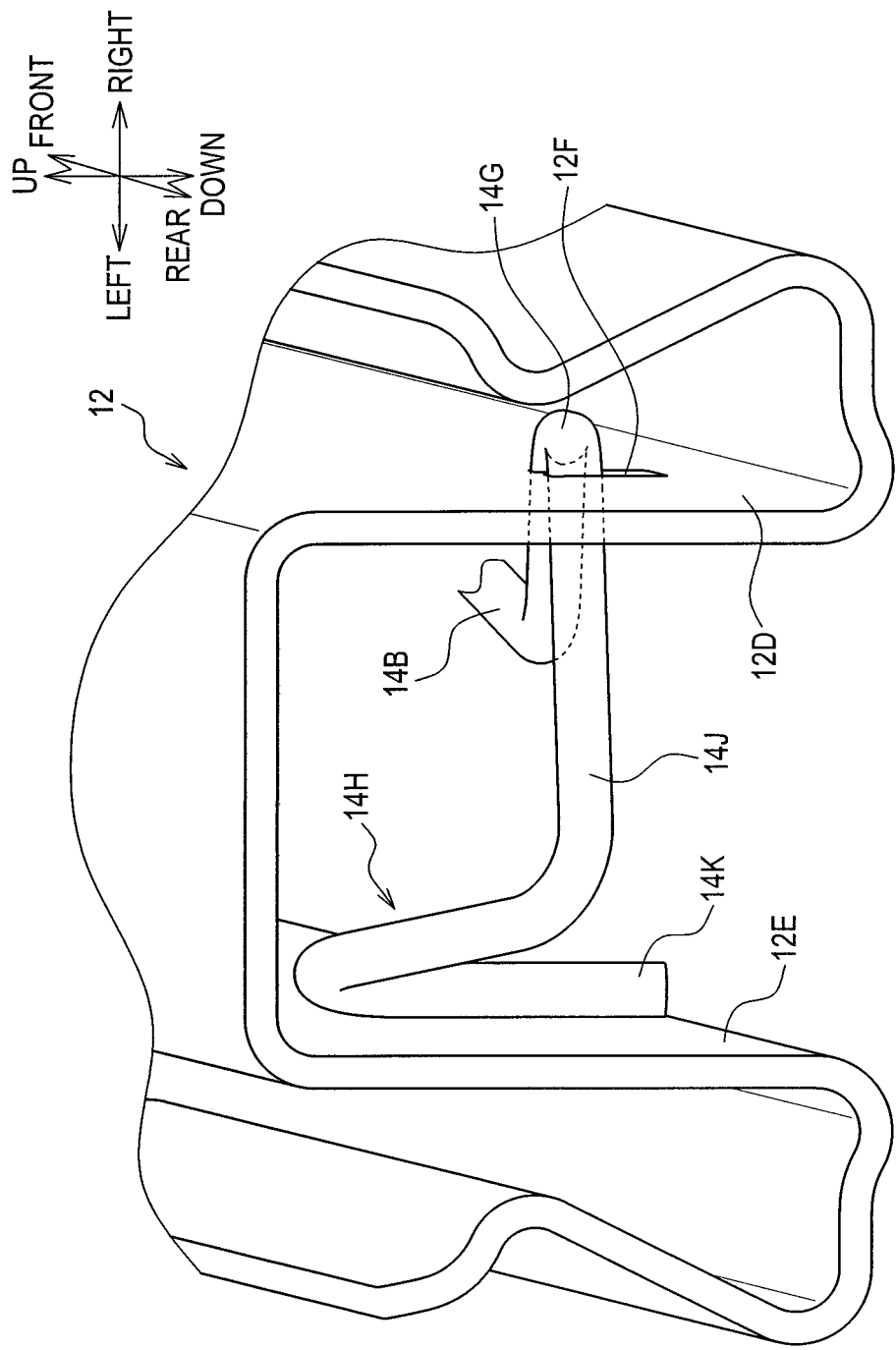
FIG. 12 shows the fixing structure of the first spring portion and the movable rail according to the first embodiment.

As shown in FIG. 12, the tapered portion 14G is formed into an acute angle shape. The tapered portion 14G is fitted into a hole 12F provided in a portion 12D of the movable rail 12. The tapered portion 14G is positioned below the comb portion 11C of the fixed rail 11. The tapered portion 14G of the present embodiment is formed by a metallic wire rod that is bent into a substantially V-shape.

Figure 11:
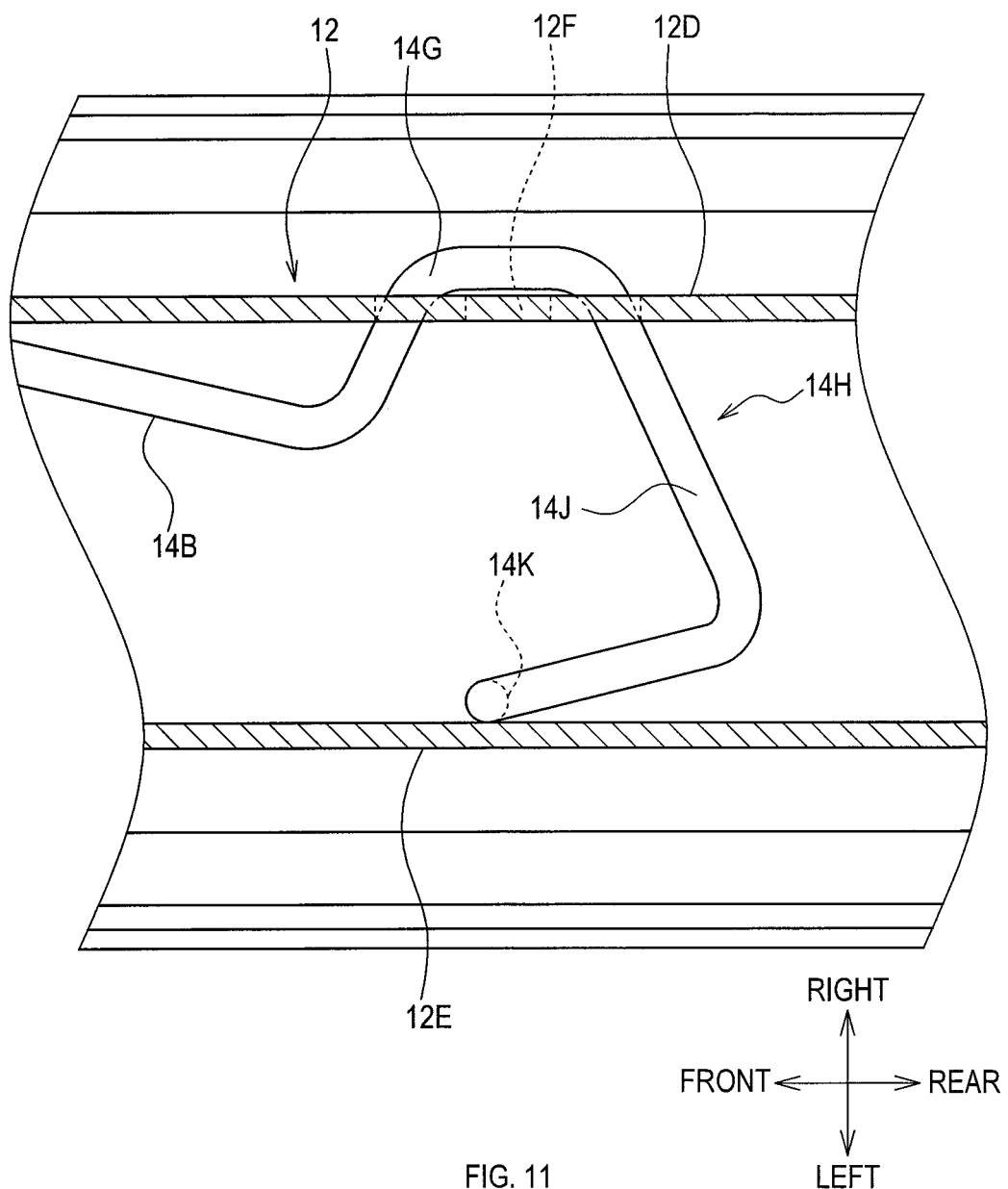
FIG. 11 shows a fixing structure of a first spring portion and the movable rail according to the first embodiment.

As shown in FIGS. 11 to 14, the portion 12D is a strip-shaped region extending in the sliding direction, which is a part of the movable rail 12 that forms a first wall substantially parallel to the sliding direction and the displacement direction of the lock plate 13. As shown in FIGS. 11, 12 and 15, a portion 12E is a strip-shaped region spaced apart from the portion 12D, which is a part of the movable rail 12 that forms a second wall substantially parallel to the portion 12D.

Figure 13:
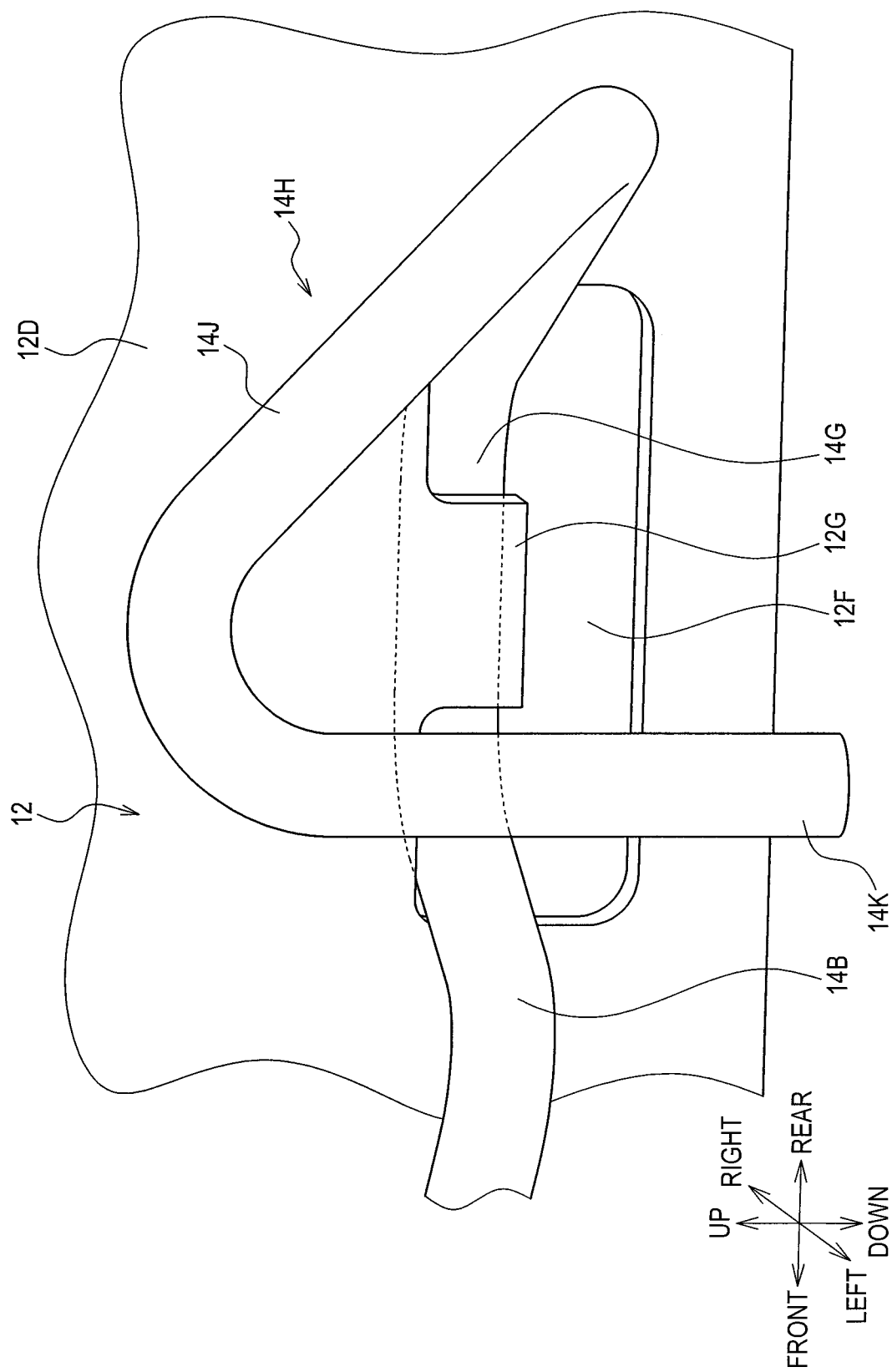
FIG. 13 shows the fixing structure of the first spring portion and the movable rail according to the first embodiment.

As shown in FIG. 13, the hole 12F is formed into an elongated shape. A long axis direction of the hole 12F coincides with the sliding direction and a dimension in a short axis direction of the hole 12F is greater than a diameter dimension of the wire rod.

In an intermediate part in the long axis direction of the hole 12F, a protrusion 12G protruding in the short axis direction from an outer edge of the hole 12F is provided. In a state where the tapered portion 14G is inserted to the hole 12F, the tapered portion 14G is locked to be caught by the protrusion 12G.

As shown in FIG. 11, the press spring portion 14H exerts an elastic force to press the tapered portion 14G toward the hole 12F. The press spring portion 14H at least comprises a torsion portion 14J and a seat portion 14K.

The torsion portion 14J is a torsion spring made from a wire rod extending from the tapered portion 14G. The seat portion 14K is a substantially straight portion extending from the torsion portion 14J in a direction crossing the long axis direction of the hole 12F. As shown in FIG. 12, the seat portion 14K is in contact with the portion 12E.

The tapered portion 14G and the press spring portion 14H are formed by bending the metallic wire rod that forms the first spring portion 14B into a preset specific shape. In other words, the first spring portion 14B, the tapered portion 14G, and the press spring portion 1411 are integrally formed.

Figure 14:
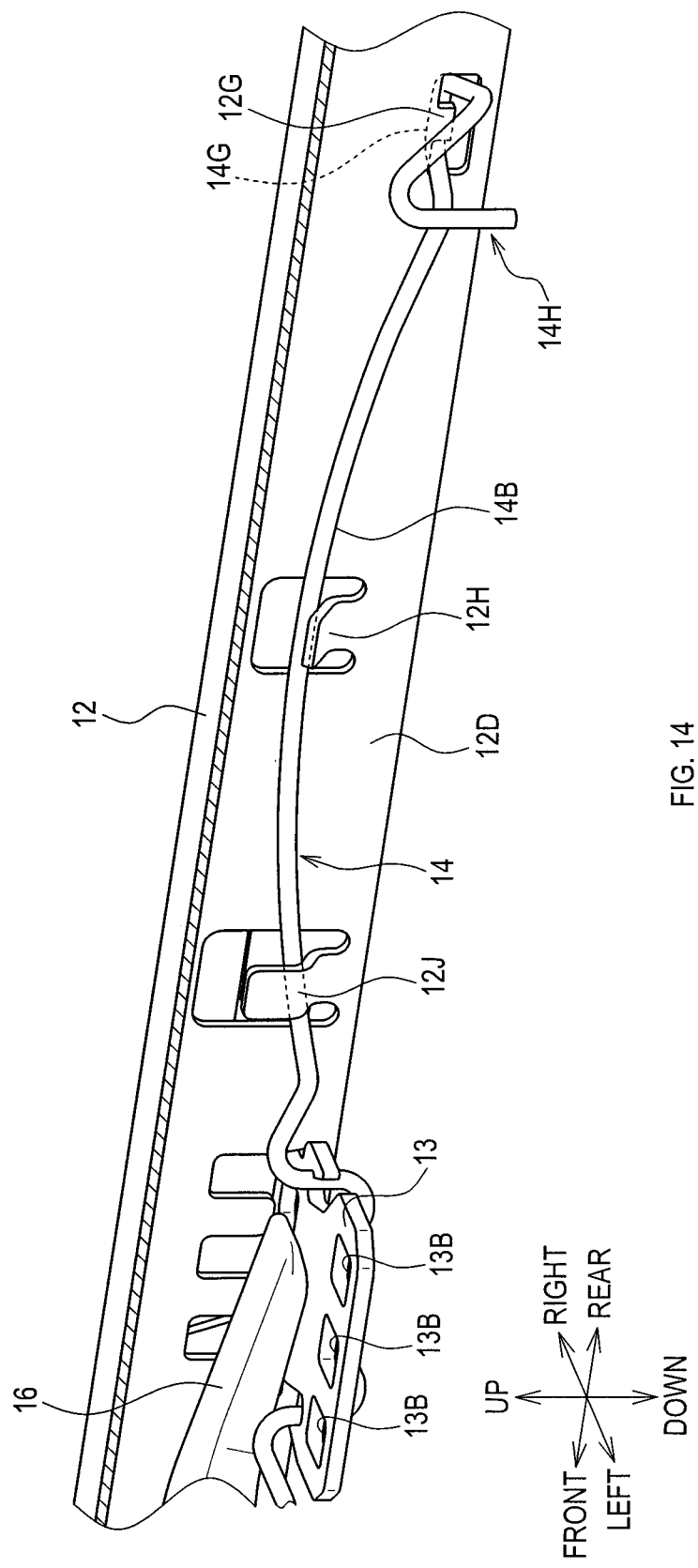
FIG. 14 shows the fixing structure of the first spring portion and the movable rail according to the first embodiment.
Figure 15:
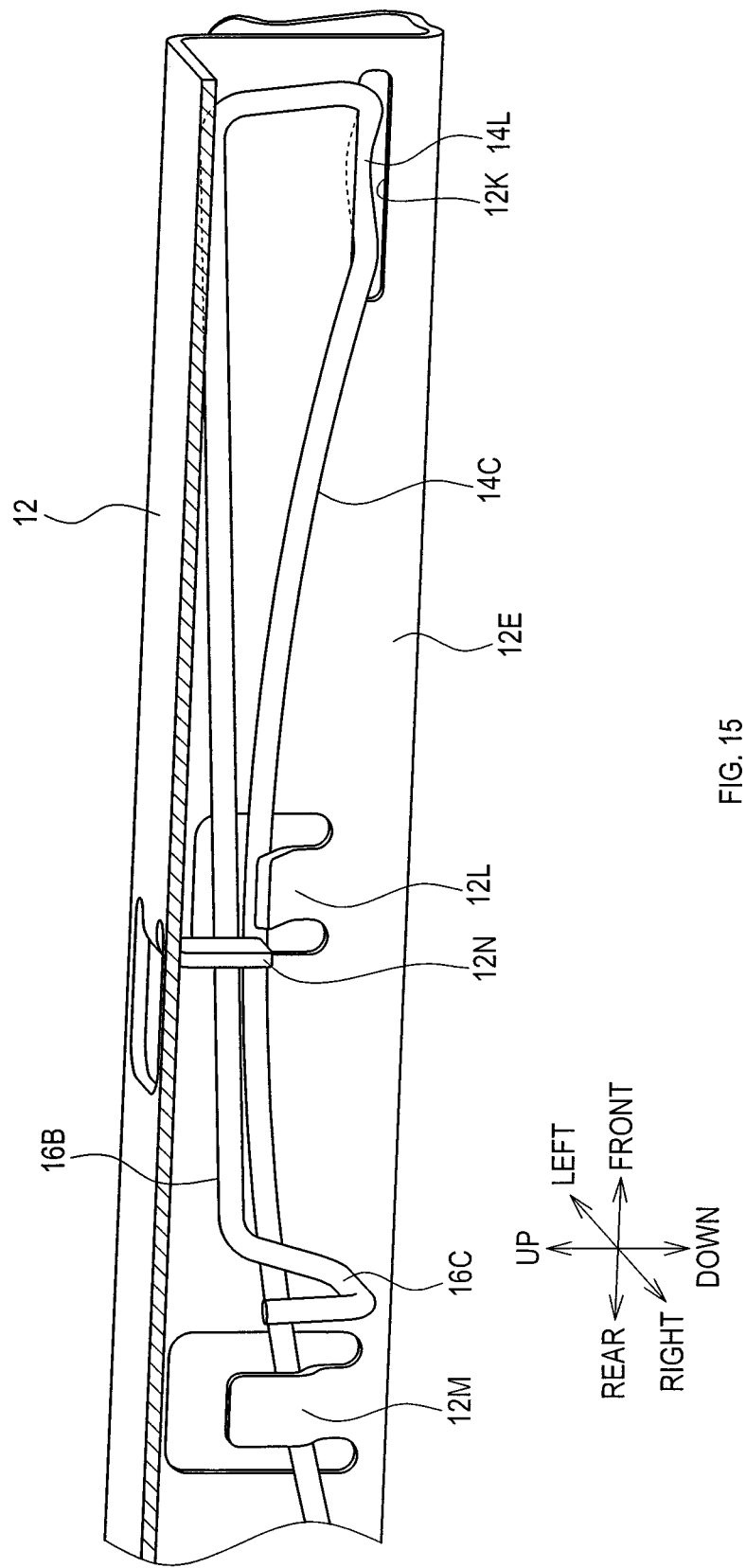
FIG. 15 shows the fixing structure of a second spring portion and the movable rail according to the first embodiment.

As shown in FIG. 14, the first spring portion 14B is supported by a first support portion 12H and a second support portion 12J. The first support portion 12H and the second support portion 12J are formed by cut and raised pieces provided in the portion 12D.

The first support portion 12H supports an intermediate part in the extending direction of first spring portion 14B. The second support portion 12J supports the first spring portion 14B on the lock plate 13 side of the first support portion 12H, and restricts displacement of the first spring portion 14B in the seat-width axis. When the lock plate 13 is displaced to the non-locking position, the first spring portion 14B elastically deforms like a bow substantially around the first support portion 12H.

<Fixing Structure of Second Spring Portion>

As shown in FIG. 15, a fixing structure of the leading end part in the extending direction of the second spring portion 14C and the movable rail 12 has a tapered portion 14L provided in the second spring portion 14C, and the like. The tapered portion 14L is formed into an acute angle shape.

The tapered portion 14L is fitted into a hole 12K provided in the portion 12E of the movable rail 12. The tapered portion 14L of the present embodiment is formed by a metallic wire rod that is bent into a substantially V-shape. The hole 12K has an elongated shape, and a long axis direction of the hole 12K coincides with the sliding direction.

The second spring portion 14C is supported by a first support portion 12L and a second support portion 12M. The first support portion 12L and the second support portion 12M are formed by cut and raised pieces provided in the portion 12E.

The first support portion 12L supports the intermediate part in the extending direction of the second spring portion 14C. The second support portion 12M supports the second spring portion 14C on the lock plate 13 side of the first support portion 12L, and restricts displacement of the second spring portion 14C in the seat-width axis. When the lock plate 13 is displaced to the non-locking position, the second spring portion 14C elastically deforms like a bow substantially around the first support portion 12L.

<Operation Member>

Figure 16:
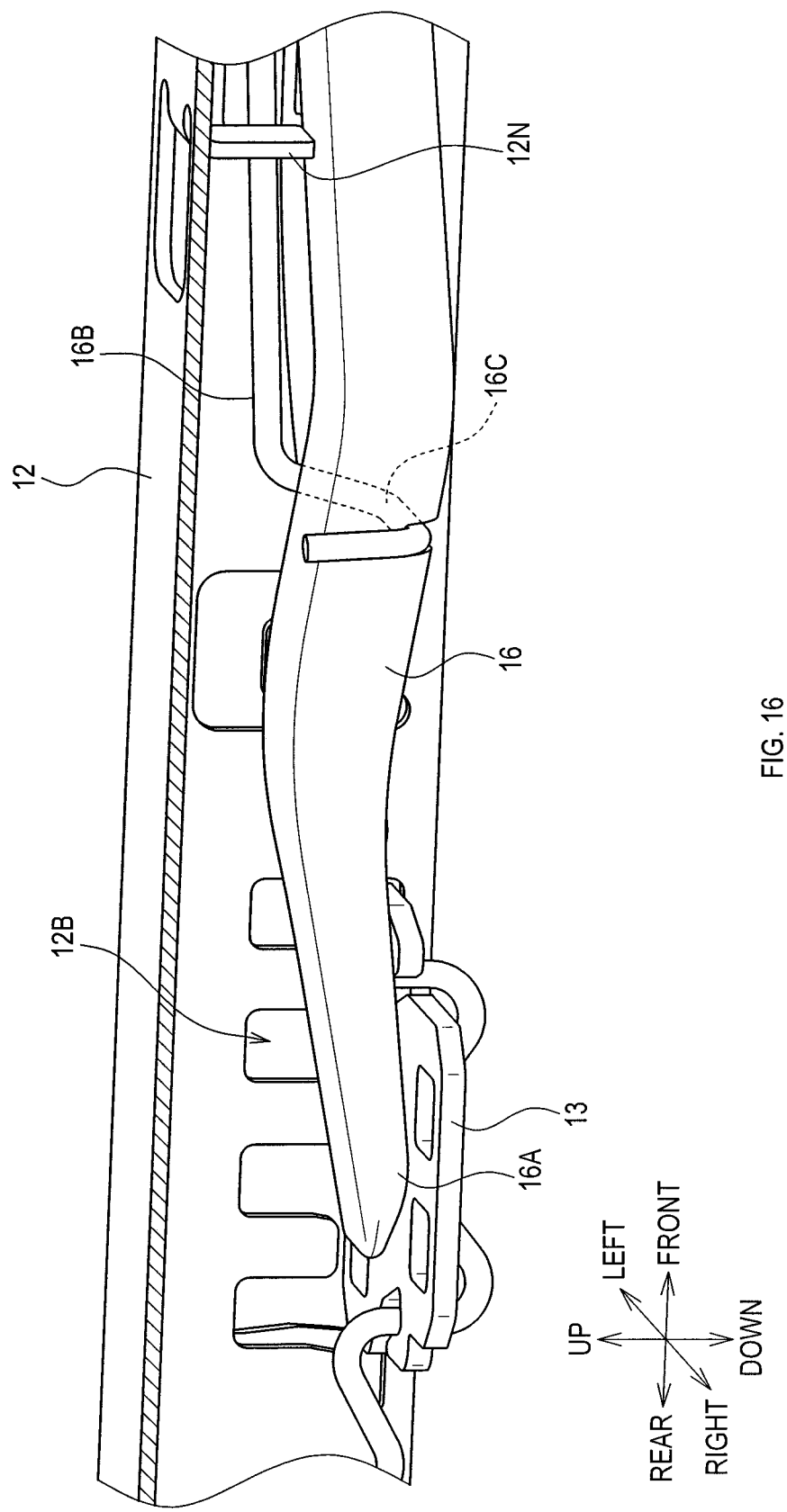
FIG. 16 shows a fixing structure of the second spring portion and the movable rail according to the first embodiment.

The operation member 16 receives an operation force and can be displaced from an initial position (see FIG. 7) to an operating position (see FIG. 16). As shown in FIG. 16, the operation member 16 comprises a pressing portion 16A. The pressing portion 16A applies the operation force to the lock plate 13 when the operation member 16 is in the operating position.

As shown in FIG. 9, the pressing portion 16A (hatched range with two-dot chain line) projected on a virtual plane parallel to the plate surface 13A of the lock plate 13 extends in a direction crossing the acting portion 14F projected on the virtual plane so as to cut across the projected acting portion 14F.

In other words, a part of the pressing portion 16A projected on the virtual plane overlaps the acting portion 14F projected on the virtual plane, and the pressing portion 16A projected on the virtual plane exists on both of one side (upper side in FIG. 9) and the other side (lower side in FIG. 9) of the acting portion 14F projected on the virtual plane.

A return spring 16B shown in FIG. 16 exerts an elastic force to return the operation member 16 in the operating position to the initial position. As shown in FIG. 15, the return spring 16B is integrally formed with the spring member 14. In other words, the return spring 16B and the spring member 14 are formed by bending one metallic wire rod into a preset specific shape.

The return spring 16B of the present embodiment is provided with a stopper 16C. The stopper 16C is locked to the operation member 16. When the stopper 16C is locked to the operation member 16, the return spring 16B can exert the elastic force to press the tapered portion 14L toward the hole 12K.

A fulcrum portion 12N provided in the movable rail 12 forms a swinging fulcrum of the operation member 16. In other words, the operation member 16 can swing around the fulcrum portion 12N. The fulcrum portion 12N is formed by a cut and raised piece obtained by cutting and raising a part of the movable rail 12.

3. Feature of Sliding Device of the Present Embodiment 3.1 Schematic Configuration of Sliding Device The lock plate 13 of the sliding device 10 of the present embodiment is displaced between the locking position and the non-locking position in the direction substantially orthogonal to the sliding direction. The spring member 14 of the sliding device 10 applies the elastic force to the plate surface 13A of the lock plate 13, unlike Patent Document 1. Therefore, the lock plate 13 operates stably.

The spring member 14 comprises the first restricting portion 14D that restricts displacement of the lock plate 13 in the first orientation in the sliding direction relative to the spring member 14, and the second restricting portion 14E that restricts displacement of the lock plate 13 in the second orientation in the sliding direction relative to the spring member 14. This restricts displacement of the lock plate 13 in the sliding direction. Thus, operation of the lock plate 13 can be stabilized.

3.2 Spring Member, Lock Plate and the Like

The spring member 14 comprises the first spring portion 14B and the second spring portion 14C. The first spring portion 14B extends from the first restricting portion 14D in the first orientation and has the leading end part in the extending direction fixed to the movable rail 12. The second spring portion 14C extends from the second restricting portion 14E in the second orientation and has the leading end part in the extending direction fixed to the movable rail 12. This can stabilize operation of the lock plate 13.

The first restricting portion 14D and the second restricting portion 14E are each formed by a bent portion obtained by bending a part of the spring member 14. This can inhibit increase in manufacturing costs of the sliding device 10.

Both the first restricting portion 14D and the second restricting portion 14E restrict the displacement of the lock plate 13 in a state in contact with the lock plate 13. This can securely restrict the displacement of the lock plate 13, and thus operation of the lock plate 13 can be stabilized.

The lock plate 13 comprises the first stopper 13C as the third restricting portion and the second stopper 13D as the fourth restricting portion that restrict displacement in the direction orthogonal to the displacement direction and the sliding direction relative to the spring member 14. This can stabilize operation of the lock plate 13.

As shown in FIGS. 9 and 10, the first stopper 13C as the first hook has the first recess 13E that contacts and surrounds the spring member 14 from three sides, and is open on one side. The second stopper 13D as the second hook has the second recess 13F that contacts and surrounds the spring member 14 from three sides and is open on one side. This can securely stabilize operation of the lock plate 13.

As shown in FIG. 10, the first stopper 13C as the first hook is provided with the first guide groove 13G that communicates with the opening of the first recess 13E and extends in the direction crossing the opening direction of the opening. The second stopper 13D as the second hook is provided with the second guide groove 13H that communicates with the opening of the second recess 13F and extends in the direction crossing the opening direction of the opening. This can inhibit the spring member 14 from coming off from the first stopper 13C and the second stopper 13D.

The spring member 14 is formed by bending one metallic wire rod into a preset specific shape. This can inhibit increase in manufacturing costs of the spring member 14.

The return spring 16B that exerts the elastic force to return the displaced operation member 16 to the initial position is integrated with the spring member 14. This can inhibit increase in manufacturing costs of the sliding device 10.

3.3 Coupling Structure of Spring Member and Lock Plate, and the Like

Since the lock plate 13 is locked and fixed to the spring member 14 by the first stopper 13C and the second stopper 13D, the lock plate 13 is stably fixed to the spring member 14. Thus, operation of the lock plate 13 becomes stable.

The acting portion 14F of the spring member 14 that applies the elastic force to the plate surface 13A is a straight portion extending from the first stopper 13C side to the second stopper 13D side, and is configured to apply the elastic force to the plate surface 13A with the entire region from the first end to the second end of the acting portion 14F. This allows the elastic force to be stably applied to the lock plate 13 in the sliding device 10.

The spring member 14 comprises the first restricting portion 14D as the first locked portion that is locked to the first stopper 13C and extends in the direction substantially orthogonal to the acting portion 14F, and the second restricting portion 14E as the second locked portion that is locked to the second stopper 13D and extends in the direction substantially orthogonal to the acting portion 14F.

This interposes the lock plate 13 between the first restricting portion 14D and the second restricting portion 14E in the sliding device 10. Thus, displacement of the lock plate 13 in the sliding direction can be restricted.

The pressing portion 16A of the operation member 16 projected on the virtual plane parallel to the plate surface 13A extends in the direction crossing the acting portion 14F projected on the virtual plane so as to cut across the projected acting portion 14F.

This can inhibit large shift between the point of action of the operation force applied to the lock plate 13 and the point of action of the elastic force in the sliding device 10. Therefore, the lock plate 13 stably operates in the sliding device 10.

3.4 Fixing Structure of First Spring Portion

The fixing structure for fixing the leading end part in the extending direction of the first spring portion 14B to the movable rail 12 comprises the acute angle-shaped tapered portion 14G provided in the spring member 14 and fitted into the hole 12F provided in the movable rail 12, and the press spring portion 14H that exerts the elastic force to press the tapered portion 14G toward the hole 12F.

Since the tapered portion 14G is pressed toward the hole 12F by the press spring portion 14H, the fixing structure is fixed to the movable rail 12 with the position of an end in an extending direction of the spring member 14 automatically adjusted.

The tapered portion 14G is formed by a metallic wire rod bent into a substantially V-shape, and the protrusion 12G protruding in the short axis direction from the outer edge of the hole 12F is provided in the intermediate part in the long axis direction of the hole 12F. This inhibits the tapered portion 14G from falling out of the hole 12F in the sliding device 10.

The press spring portion 14H comprises the torsion portion 14J formed by the wire rod extending from the tapered portion 14G, and the substantially straight seat portion 14K extending from torsion portion 14J in the direction crossing the long axis direction of the hole 12F.

The seat portion 14K is in contact with the portion 12E of the movable rail 12 facing the portion 12D provided with the hole 12F. Thus, even if the tapered portion 14G, for example, swings and is displaced in the short axis direction around the hole 12F, the swinging can be effectively reduced.

Second Embodiment

Figure 17:
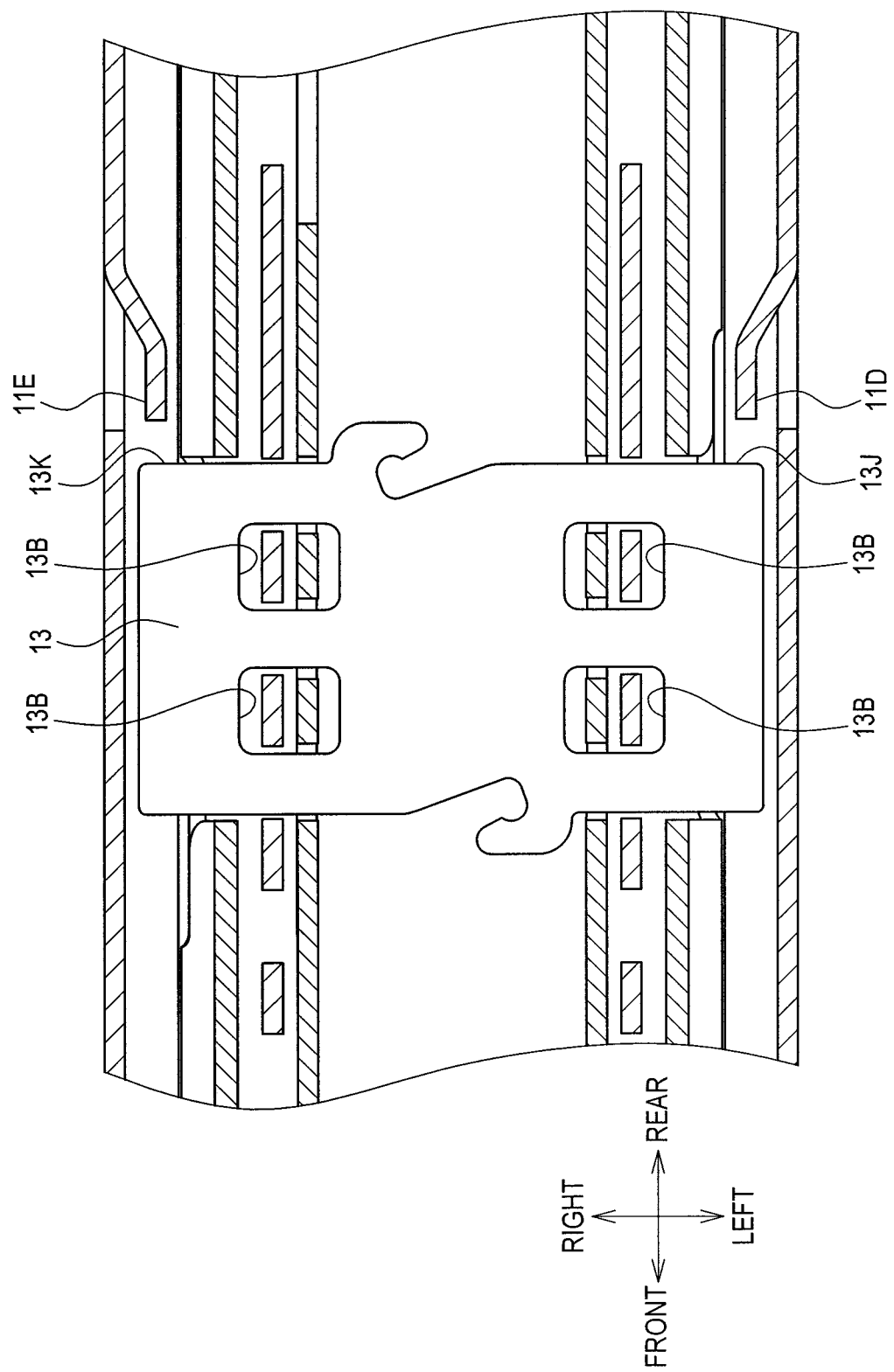
FIG. 17 shows the lock plate according to a second embodiment.
Figure 18:
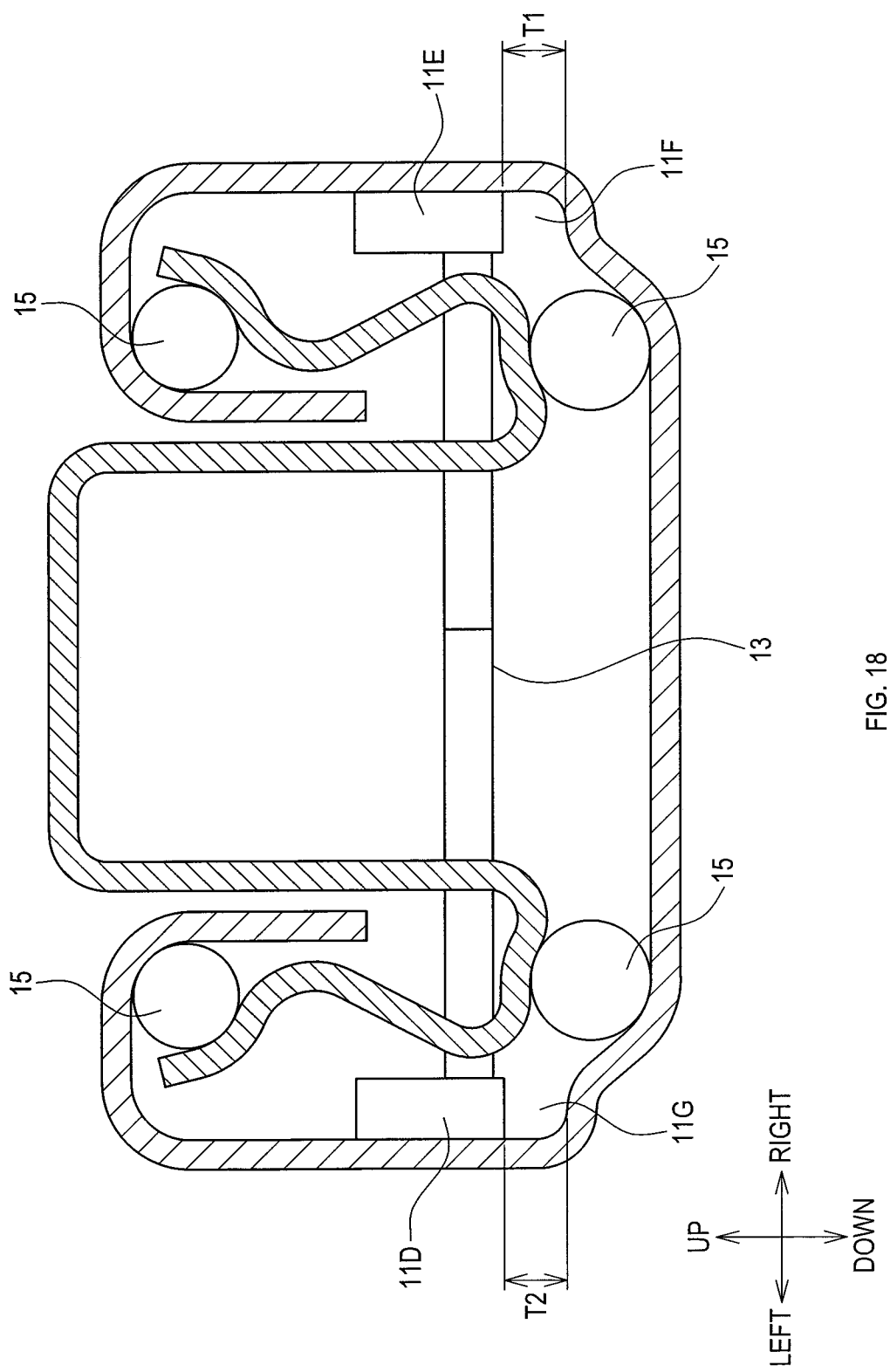
FIG. 18 shows the lock plate and the movable rail according to the second embodiment.

In the sliding device 10 in the second embodiment of the present disclosure shown in FIGS. 17 and 18, a stopper function is added to the lock plate 13. Description below explains the difference from the sliding device 10 of the above-described embodiment. The same reference numbers as in the above-described embodiment are attached to the components and the like that are the same as those of the above-described embodiment. Thus, duplicate description is not repeated in the present embodiment.

<Configuration of Stopper Function>

As shown in FIGS. 17 and 18, the fixed rail 11 is provided with at least one restricting portion (in the present embodiment, two restricting portions) 11D, 11E. The lock plate 13 is provided with abutment portions 13J, 13K that can contact the restricting portions 11D, 11E.

Slide displacement of the movable rail 12 is restricted when any of the following states is established: (a) the restricting portion 11D and the abutment portion 13J come into contact with each other, (b) the restricting portion 11E and the abutment portion 13K come into contact with each other, and (c) both the restricting portions 11D, 11E and the abutment portions 13J, 13K come into contact with each other.

As shown in FIG. 18, the abutment portions 13J, 13K are provided at positions where the abutment portions 13J, 13K can come into contact with the restricting portions 11D, 11E when the lock plate 13 is in the non-locking position.

In other words, when the lock plate 13 is in the locking position, the restricting portions 11D, 11E and the abutment portions 13J, 13K are not in contact with each other. In the present embodiment, when the movable rail 12 slides toward the seat rear side, the restricting portions 11D, 11E and the abutment portions 13J, 13K can come into contact with each other.

Gaps 11F, 11G are provided below the restricting portions 11D, 11E. The gaps 11F, 11G allow the lock plate 13 to be displaced in the sliding direction without interfering with the restricting portions 11D, 11E.

Gap dimensions T1, T2 of the gaps 11F, 11G are greater than a plate thickness dimension of the lock plate 13. The restricting portions 11D, 11E of the present embodiment are formed by cut and raised pieces each obtained by cutting and raising a part of the fixed rail 11.

<Feature of Sliding Device of the Present Embodiment>

In the sliding device of the present embodiment, the lock plate 13 when not locked come into contact with the restricting portions 11D, 11E of the fixed rail 11 to restrict the slide of the movable rail 12.

The gaps 11F, 11G are provided below the restricting portions 11D, 11E. This allows an operator to easily assemble and disassemble the sliding device by bringing the lock plate 13 lower than the restricting portions 11D, 11E.

Other Embodiments

In the first embodiment, the number of protrusions and recesses provided in the comb portion 12B is greater than the number of protrusions and recesses provided in the comb portion 12C. The present disclosure is not limited to this.

The present disclosure may be configured such that, for example, the number of protrusions and recesses provided in the comb portion 12B is smaller than the number of protrusions and recesses provided in the comb portion 12C, or the number of protrusions and recesses provided in the comb portion 12B is the same as the number of protrusions and recesses provided in the comb portion 12C.

The spring member 14 in the above-described embodiments comprises the first restricting portion (first locked portion) 14D and the second restricting portion (second locked portion) 14E. The restricting portions 14D, 14E extend in the direction substantially orthogonal to the straight acting portion 14F. The present disclosure is not limited to this.

Instead, the present disclosure may be configured such that, for example, the first restricting portion (first locked portion) 14D and the second restricting portion (second locked portion) 14E are eliminated, or the first restricting portion 14D and the second restricting portion 14E extend in a direction crossing the acting portion 14F at an acute or obtuse angle.

In the above-described embodiments, the first stopper (third restricting portion) 13C and the second stopper (fourth restricting portion) 13D are provided. The first stopper 13C and the second stopper 13D are formed into the first hook and the second hook provided on the lock plate 13.

The present disclosure is not limited to this. Instead, the present disclosure may be configured such that, for example, the first stopper 13C and the second stopper 13D are eliminated, or each of the first stopper 13C and the second stopper 13D is formed into a shape other than a hook.

In the above-described embodiments, the first stopper 13C (first hook) and the second stopper (second hook) 13D are provided with the first guide groove 13G and the second guide groove 13H, respectively. The present disclosure is not limited to this. The present disclosure may be configured such that, for example, the first guide groove 13G and the second guide groove 13H are eliminated.

The spring member 14 according to the above-described embodiments is formed by bending one metallic wire rod into a preset specific shape. The present disclosure is not limited to this.

The spring member 14 according to the above-described embodiments is integrated with the return spring 16B. The present disclosure is not limited to this. In the present disclosure, for example, the return spring 16B may be a separate member from the spring member 14.

The acting portion 14F according to the above-described embodiments is configured to be straight so that the elastic force is applied to the plate surface 13A of the lock plate 13 with the entire region from the first end to the second end of the acting portion 14F. The present disclosure is not limited to this. Instead, in the present disclosure, for example, the acting portion 14F may have a serpentine shape.

In the above-described embodiments, the pressing portion 16A of the operation member 16 projected on the virtual plane parallel to the plate surface 13A extends in the direction crossing the acting portion 14F projected on the virtual plane so as to cut across the projected acting portion 14F. However, the present disclosure is not limited to this.

The fixing structure of the first spring portion 14B and the movable rail 12 shown in the above-described embodiments has the tapered portion 14G and the press spring portion 14H that presses the tapered portion 14G toward the hole 12F, and the tapered portion 14G and the press spring portion 14H are integrally formed with the spring member 14. The present disclosure is not limited to this.

In the intermediate part in the long axis direction of the hole 12F according to the above-described embodiments, the protrusion 12G is provided that protrudes in the short axis direction from the outer edge of the hole 12F and is caught by the tapered portion 14G. The present disclosure is not limited to this. Instead, the present disclosure may be configured such that, for example, the protrusion 12G is eliminated.

The acting portion 14F according to the above-described embodiments is a straight portion extending from the first stopper 13C side to the second stopper 13D side. The present disclosure is not limited to this. Instead, in the present disclosure, for example, the acting portion 14F may be a portion bent into a rectangular wave.

The acting portion 14F according to the above-described embodiments is configured such that the elastic force is applied to the plate surface 13A with the entire region from the first end to the second end of the acting portion 14F. The present disclosure is not limited to this. The present disclosure may be configured such that, for example, the elastic force is applied to the plate surface 13A at a part of the acting portion 14F.

The first spring portion 14B according to the above-described embodiments is shifted to the right in the seat-width axis relative to the second spring portion 14C. The present disclosure is not limited to this. The present disclosure may be configured such that, for example, (a) the first spring portion 14B is shifted to the left in the seat-width axis relative to the second spring portion 14C, (b) the first spring portion 14B is located on the same side as the second spring portion 14C, and so on.

In the above-described embodiments, the sliding device of the present disclosure is applied to a vehicle seat. Application of the present disclosure is not limited to this. The present disclosure can be also applied to a seat for use in a vehicle such as railroad vehicles, ships and boats, and aircrafts, as well as to a stationary type seat for use such as in theatres and at home.

Furthermore, the present disclosure is not limited to the above-described embodiments as long as the present disclosure meets the gist of the invention recited in attached claims. Thus, at least two embodiments among the embodiments described above may be combined, or any of the constituent features described in the above embodiments may be eliminated.

What is claimed is:

1. A sliding device configured to slidably support a seat, the sliding device comprising:
   a fixed rail;
   a movable rail configured to be fixed to a seat body of the seat, the movable rail being slidable relative to the fixed rail;
   a lock plate held by the movable rail, the lock plate being displaceable in a direction substantially orthogonal to a sliding direction of the movable rail, the lock plate being displaceable between a locking position where the lock plate engages with the fixed rail and restricts slide of the movable rail and a non-locking position where the restriction of slide of the movable rail is released, and the lock plate having a plate surface that crosses a displacement direction of the lock plate;
   a spring member that applies to the plate surface an elastic force to maintain the lock plate in the locking position;
   a first stopper provided on the lock plate, the first stopper locking and fixing a first end of the lock plate in a first orientation in the sliding direction to the spring member; and
   a second stopper provided on the lock plate, the second stopper locking and fixing a second end of the lock plate in a second orientation in the sliding direction to the spring member, the second stopper being provided at a position shifted in a first direction orthogonal to the displacement direction and the sliding direction relative to the first stopper,
   wherein the first stopper and the second stopper extend in a plane parallel to the plate surface,
   wherein the first stopper extends in the first orientation in the sliding direction from the first end of the lock plate, and the second stopper extends in the second orientation in the sliding direction from the second end of the lock plate,
   wherein the spring member includes a first locked portion locked to the first stopper, and a second locked portion locked to the second stopper, and
   wherein the first locked portion of the spring member and the second locked portion of the spring member pass through the lock plate in directions substantially perpendicular to the plate surface.

2. The sliding device according to claim 1,
   wherein the spring member is formed by bending a metallic wire rod into a preset specific shape,
   wherein the spring member is provided with an acting portion that applies the elastic force to the plate surface, the acting portion being present between the first stopper and the second stopper, the acting portion being configured to apply the elastic force to the plate surface at least at a portion in a range from a first end of the acting portion to a second end of the acting portion.

3. The sliding device according to claim 2, wherein
the first locked portion extends in a first direction substantially orthogonal to the acting portion, and
the second locked portion extends in a second direction substantially orthogonal to the acting portion.

4. The sliding device according to claim 2, further comprising:
an operation member that is configured to receive an operation force and is configured to be displaced from an initial position, the operation member comprising a pressing portion that is configured to apply the operation force to the lock plate, the operation member being configured to displace the lock plate to the non-locking position,
wherein the pressing portion projected on a virtual plane parallel to the plate surface extends in a direction crossing the acting portion projected on the virtual plane so as to cut across the projected acting portion.

5. The sliding device according to claim 3, further comprising:
an operation member that is configured to receive an operation force and is configured to be displaced from an initial position, the operation member comprising a pressing portion that is configured to apply the operation force to the lock plate, the operation member being configured to displace the lock plate to the non-locking position,
wherein the pressing portion projected on a virtual plane parallel to the plate surface extends in a direction crossing the acting portion projected on the virtual plane so as to cut across the projected acting portion.

6. The sliding device according to claim 2,
wherein the spring member comprises: a first spring portion that extends from the acting portion in the first orientation in the sliding direction; and a second spring portion that extends from the acting portion in the second orientation in the sliding direction,
wherein the acting portion, the first spring portion, and the second spring portion are formed by one metallic wire rod, and
wherein the first spring portion is shifted in a second direction orthogonal to the displacement direction and the sliding direction, relative to the second spring portion.

7. A sliding device configured to slidably support a seat, the sliding device comprising:
a fixed rail;
a movable rail configured to be fixed to a seat body of the seat, the movable rail being slidable relative to the fixed rail;
a lock plate held by the movable rail, the lock plate being displaceable in a direction substantially orthogonal to a sliding direction of the movable rail, the lock plate being displaceable between a locking position where the lock plate engages with the fixed rail and restricts slide of the movable rail and a non-locking position where the restriction of slide of the movable rail is released, and the lock plate having a plate surface that crosses a displacement direction of the lock plate;
a spring member that applies to the plate surface an elastic force to maintain the lock plate in the locking position;
a first stopper provided on the lock plate, the first stopper locking and fixing a first end of the lock plate in the sliding direction to the spring member; and
a second stopper provided on the lock plate, the second stopper locking and fixing a second end of the lock plate in the sliding direction to the spring member, the second stopper being provided at a position shifted in a first direction orthogonal to the displacement direction and the sliding direction relative to the first stopper,
wherein the spring member is formed by bending a metallic wire rod into a preset specific shape,
wherein the spring member is provided with an acting portion that applies the elastic force to the plate surface, the acting portion being present between the first stopper and the second stopper, the acting portion being configured to apply the elastic force to the plate surface at least at a portion in a range from a first end of the acting portion to a second end of the acting portion,
wherein the spring member comprises: a first spring portion that extends from the acting portion in a first orientation in the sliding direction; and a second spring portion that extends from the acting portion in a second orientation in the sliding direction,
wherein the acting portion, the first spring portion, and the second spring portion are formed by one metallic wire rod, and
wherein the first spring portion is shifted in a second direction orthogonal to the displacement direction and the sliding direction, relative to the second spring portion.

* * * * *